FINDER ARRANGEMENT IN TELEPHONE SYSTEMS
Filed Feb. 1, 1954 11 Sheets-Sheet 1
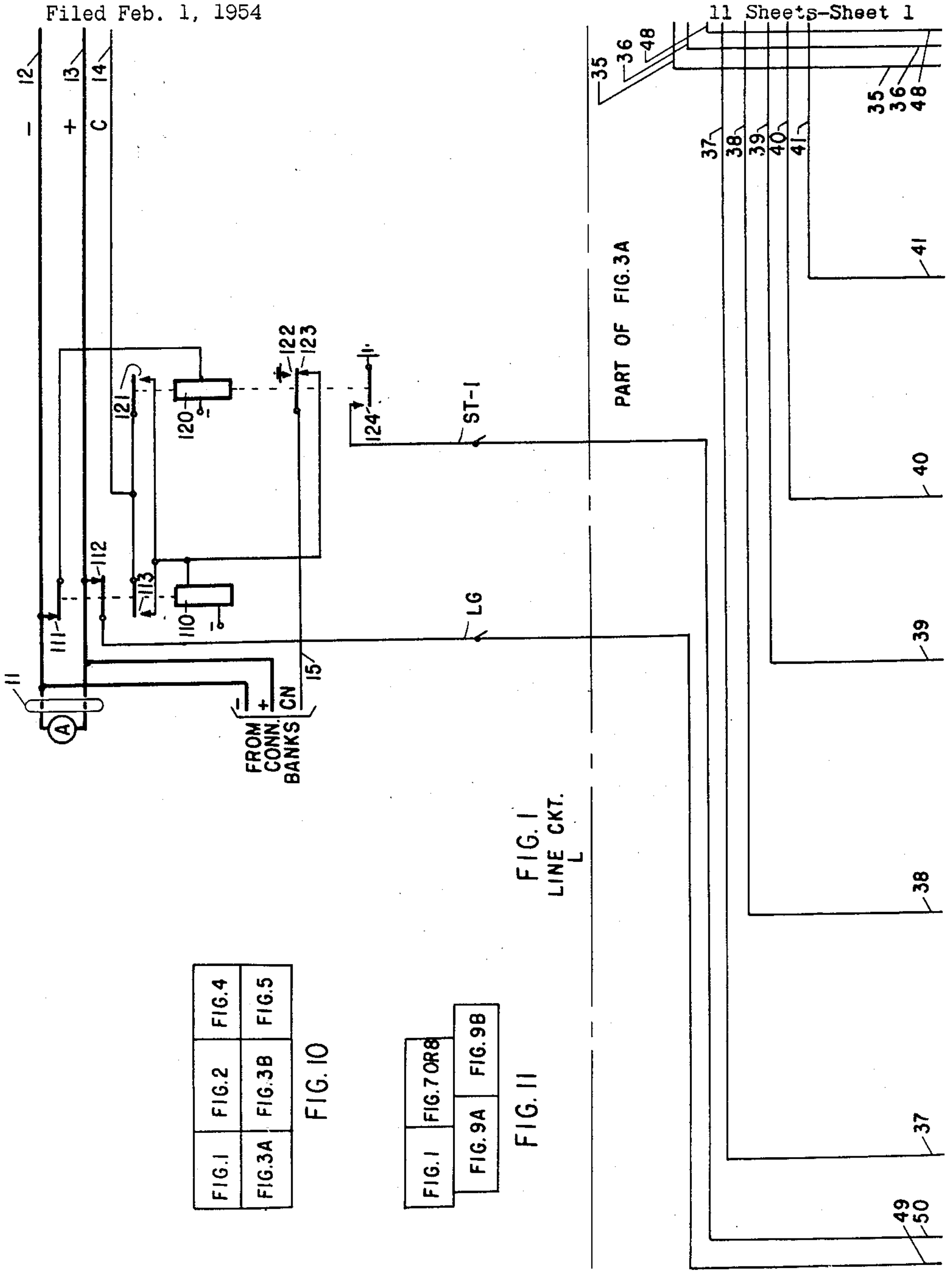
FIG. 1 LINE CKT. L, FIG. 10, FIG. 11
INVENTOR.
CLARENCE E. LOMAX
BY Wm. Walter Owen
ATTY.

Dec. 18, 1956 C. E. LOMAX 2,774,819
FINDER ARRANGEMENT IN TELEPHONE SYSTEMS
Filed Feb. 1, 1954 11 Sheets-Sheet 2
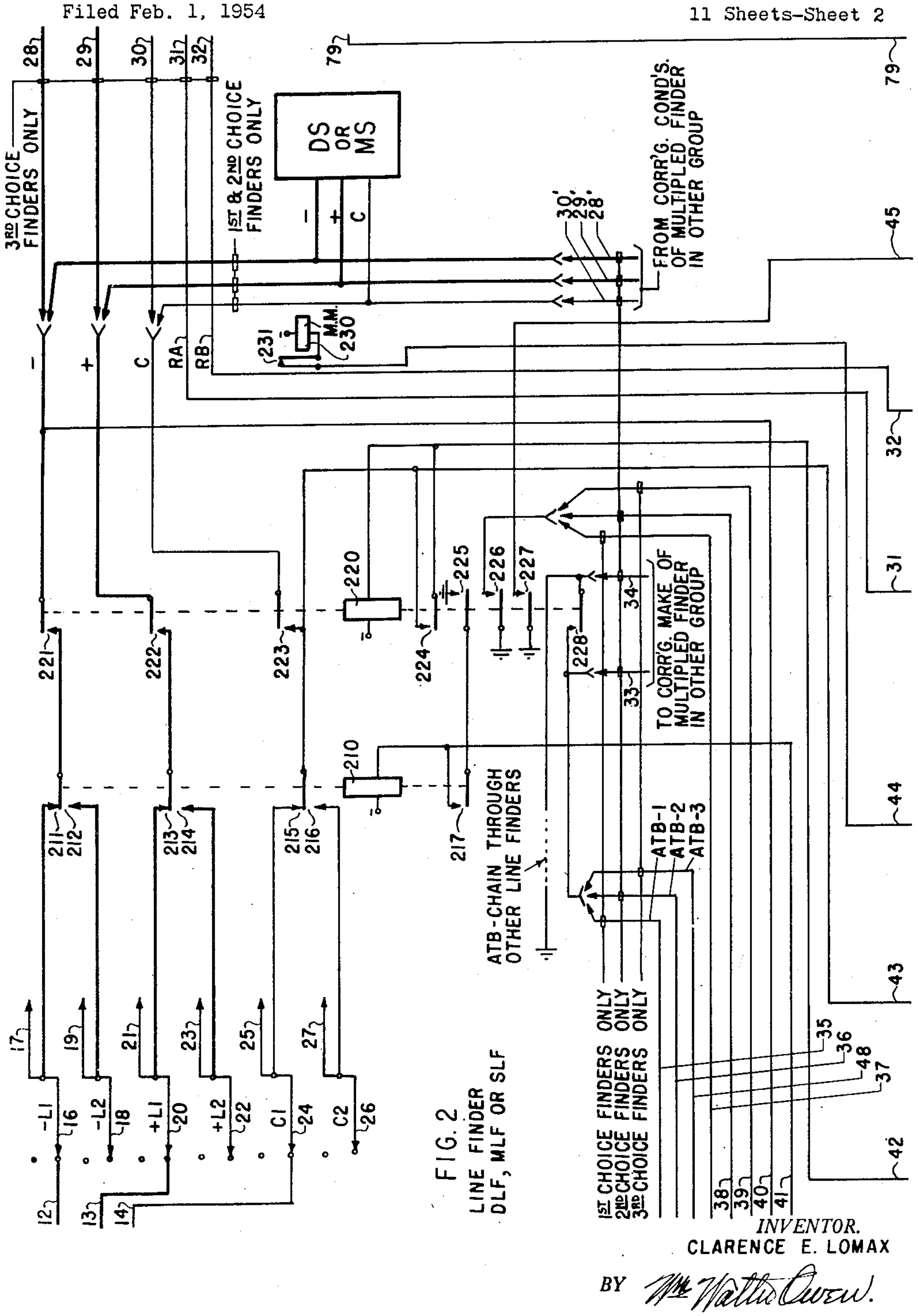
FIG. 2 LINE FINDER DLF, MLF OR SLF
INVENTOR.
CLARENCE E. LOMAX
BY Wm. Walter Owen
ATTY.

FINDER ARRANGEMENT IN TELEPHONE SYSTEMS

Filed Feb. 1, 1954 11 Sheets-Sheet 3

PRIMARY ALLOTTER
PA

INVENTOR.
CLARENCE E. LOMAX
BY Wm. Watts Owen
ATTY.

INVENTOR.
CLARENCE E. LOMAX
BY Wm. Walter Owen
ATTY.

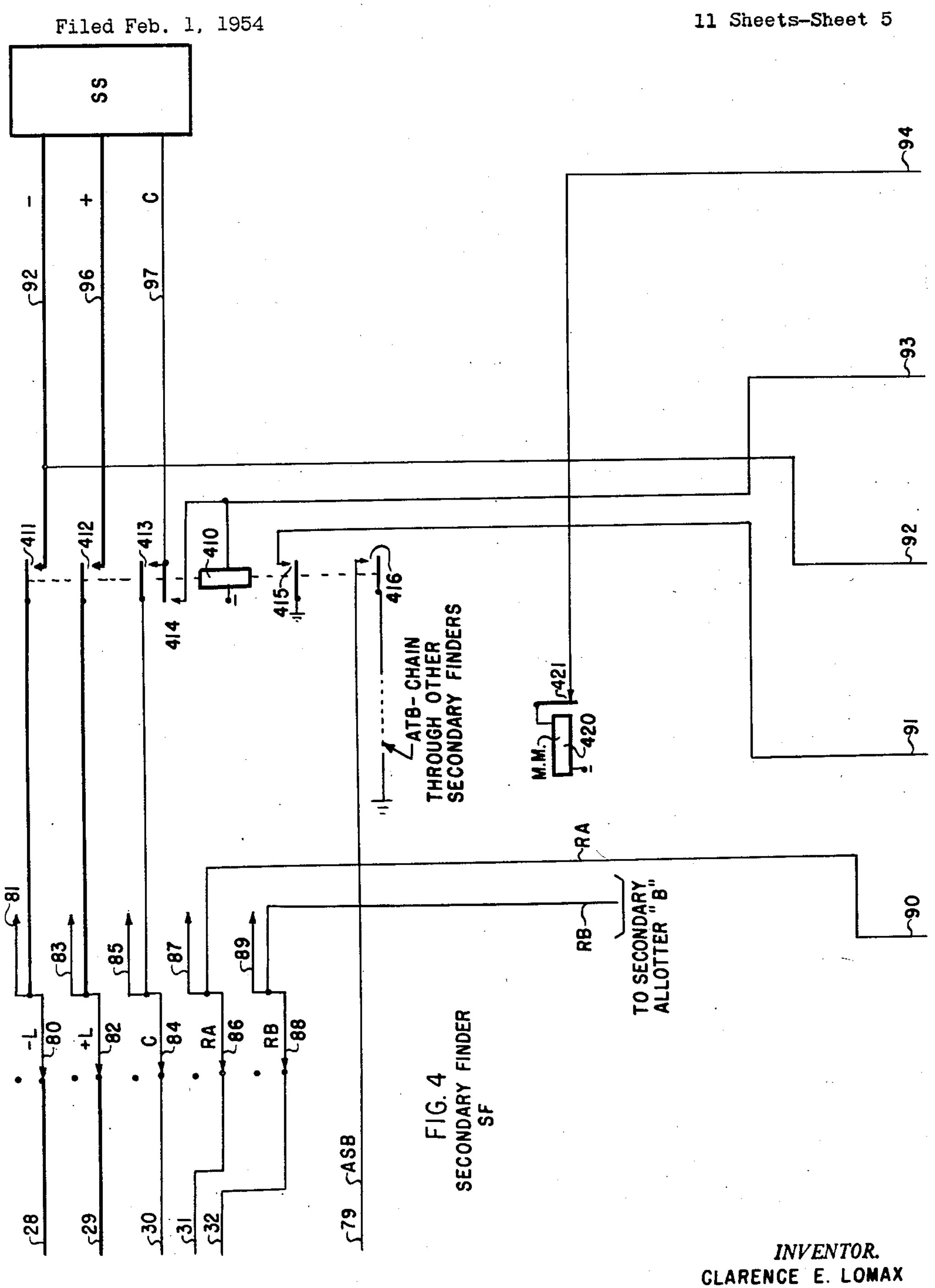
FIG. 4 SECONDARY FINDER SF
INVENTOR.
CLARENCE E. LOMAX
BY Wm. Walter Owen
ATTY.

SECONDARY ALLOTTER
SA-A

INVENTOR.
CLARENCE E. LOMAX

BY Wm. Walter Owen

ATTY.

INVENTOR.
CLARENCE E. LOMAX
BY Mc Watters Owen
ATTY.

INVENTOR.
CLARENCE E. LOMAX

BY Wm. Watts Owen

ATTY.

INVENTOR.
CLARENCE E. LOMAX

BY

ATTY.

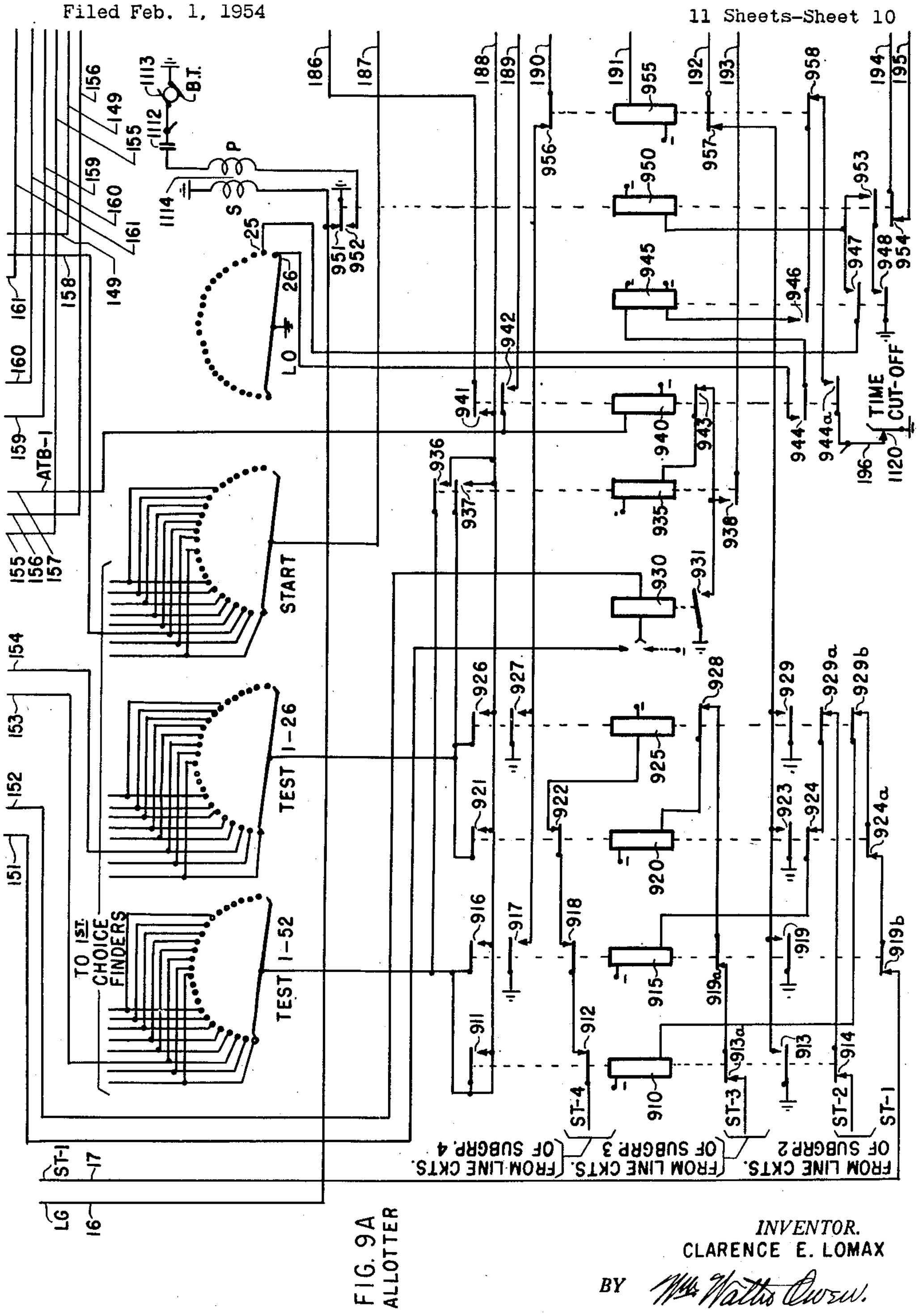
FIG. 9A ALLOTTER
INVENTOR.
CLARENCE E. LOMAX
BY Wm. Walter Owen.
ATTY.

Dec. 18, 1956 C. E. LOMAX 2,774,819
FINDER ARRANGEMENT IN TELEPHONE SYSTEMS
Filed Feb. 1, 1954 11 Sheets-Sheet 11
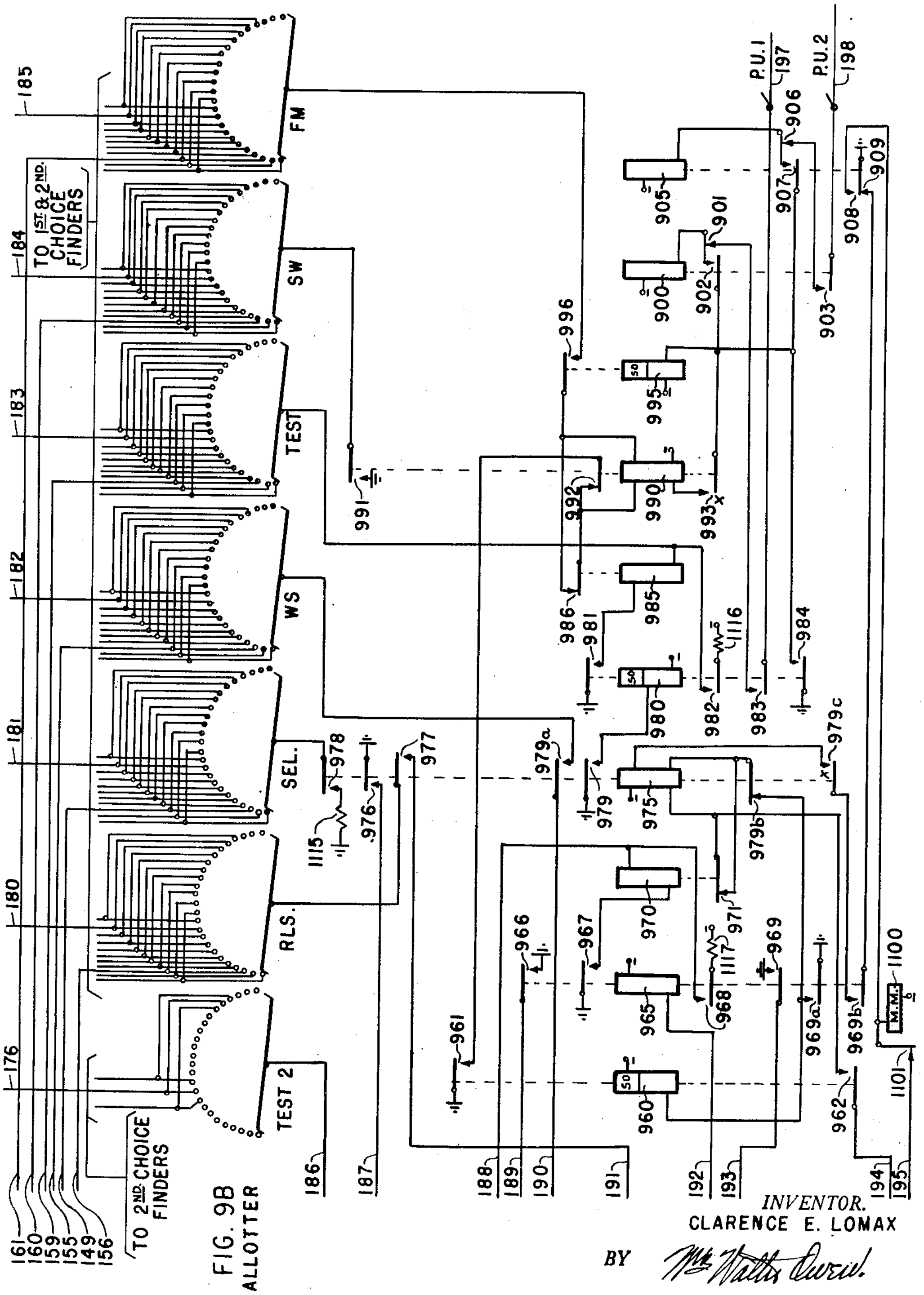
FIG. 9B ALLOTTER
INVENTOR.
CLARENCE E. LOMAX
BY [signature]
ATTY.

United States Patent Office 2,774,819

Patented Dec. 18, 1956

2,774,819

FINDER ARRANGEMENT IN TELEPHONE SYSTEMS

Clarence E. Lomax, Chicago, Ill., assignor to Automatic Electric Laboratories, Inc., Chicago, Ill., a corporation of Delaware Application February 1, 1954, Serial No. 407,263

33 Claims. (Cl. 179—18)

The invention relates to telephone systems and, more particularly, to the non-numerical switching stages in such systems.

The invention in one of its primary aspects is concerned with line finder arrangements in such systems in which at least a part of the line finders of a given group are trunked to first numerical switches such as selectors in common with line finders of one or more other groups. As the traffic peaks in different line groups are unlikely to coincide, such a trunking arrangement reduces the number of numerical switches required to handle the traffic originating in these groups.

It is a broad object of the invention to enhance the economy and/or the operating speed and reliability of finder systems, especially those involving commonly trunked line finders.

In one form of common trunking, secondary finders are interposed between at least a part of the line finders and of the first numerical switches, and each of these secondary finders has access to line finders of a plurality of groups. In systems of this type, common apparatus, usually in the form of allotter switches, are associated with the finders whereby upon the initiation of a call in a given line group, an idle line finder in this group is started in search of the calling line and an idle secondary finder in search of the started primary finder. In order to avoid delay in the case of overlapping calls from different groups, the allotter apparatus is preferably arranged so that two or more secondary finders can be simultaneously started in search of primary finders in calling condition.

In co-pending United States patent application Serial No. 344,988, filed by C. E. Lomax on March 27, 1953, a secondary finder system of this last-mentioned kind has been disclosed in which there is associated with each group of primary finders a primary allotter and in which each of these primary allotters has a secondary allotter fixedly associated therewith. Moreover, means are provided in this system for indicating to the secondary finder taken into use by a given secondary allotter the primary group identity of the particular allotter pair. Therefore, in the case of overlapping calls as many secondary allotter switches and likewise, as many secondary finders may be hunting simultaneously as there are line groups in calling condition; yet, this system makes it possible to insure, if desired, that a given secondary finder can seize only the "related" primary finder, i. e. the primary finder taken into use by the same allotter pair that took the particular secondary finder into use. Such prevention of what may be termed primary-secondary cross-connections permits an early release of the associated secondary allotter under all conditions, regardless of whether primary finders in other groups are still waiting for service.

It is one object of the present invention to further improve the efficiency of secondary finder arrangements,  particularly arrangements of this type in which primary-secondary cross-connections are avoided.

In accordance with one feature of the invention, instead of fixedly associating a given secondary allotter with a given primary allotter, there are provided a plurality of connecting means for establishing an individual connection between a given primary and secondary allotting apparatus in accordance with the availability of said apparatus, to form pairs of allotting apparatus. These connecting means may, for example, include a plurality of switching devices, each associated with a given primary allotter, having access to the various secondary allotters and being effective in response to the seizure of an idle primary finder by the afore-mentioned primary allotter to individually connect the primary allotter with the start conductor of an idle secondary allotter.

In a preferred embodiment of the invention shown herein, in which there are provided a total of two secondary allotters, the above switching device is in the form of an odd-even relay of the type having a main and an auxiliary set of contact springs both of which may assume two alternative conditions, the condition of the main contact set being changed once for every full actuating and releasing cycle of the relay magnet and that of the auxiliary contact set being changed upon each actuation and also upon each release of that magnet. Mechanical designs for odd-even relays of this type are shown and described, for example, in United States Patent 2,617,906, issued on November 11, 1952 to R. F. Stehlik, and in co-pending United States patent applications Serial No. 319,508, now Patent No. 2,681,961 and Serial No. 328,848, now abandoned, filed by Hans Sengebusch on November 8, 1952 and December 31, 1952 respectively. In accordance with one feature of the invention such an odd-even relay is used as a switching or hunting device by placing the relay in a self-interrupter circuit energized from a guarding potential and extending over the corresponding contact of the main contact set, the relay magnet and a break contact forming a part of the auxiliary contact set, in series.

In accordance with another feature of the invention, primary-secondary cross-connections are prevented by providing each secondary finder with a plurality of sets of test bank contacts, each set for use in conjunction with a different secondary allotter, and by letting the primary allotter mark the seized primary finder as calling in that set of test bank contacts of the secondary finders which corresponds to the particular secondary allotter selected by the primary allotter. In the afore-mentioned embodiment this marking is effected over contacts forming a part of the main contact set of the above odd-even relay.

In accordance with another feature incorporated in the above-mentioned embodiment the line finders of a given group comprise both line finders which are separately and individually trunked to an associated first numerical switch, and line finders which are trunked to a first numerical switch in common with line finders of one or more other groups; and these commonly trunked finders, in turn, comprise finders of two kinds, viz. line finders which are directly connected to a given first numerical switch in multiple with a line finder of one or more other groups, and line finders which are trunked to the first numerical switches by way of secondary non-numerical switches such as secondary finders. The primary allotter switches, although of the non-homing type, have means associated therewith such that the individually trunked line finders are allotted in preference over the commonly trunked line finders. For example, the individually trunked finders may be treated as first choice finders, the multipled finders as second choice finders and the secondary trunked finders as third choice finders. This embodiment of the invention, therefore, combines the features and advantages of what is known as a graded multiple finder arrangement with those of partial secondary trunking.

It is another object of the invention to provide in finder systems, particularly of the kind including both individually and commonly trunked finders, novel and improved means for indicating an all-finders-busy condition.

Thus there are provided in accordance with a further feature of the invention, means operative upon both the individually and the commonly trunked line finders of a given group being busy, for connecting a source of busy tone voltage to all line circuits of that group. For example, each line finder allotter may be equipped with a busy tone coil whose primary winding is normally open-circuited and whose secondary winding is normally shunted, one of the two battery potentials, preferably ground, being supplied to the line circuits of the group by way of this shunt connection and a common conductor. When no more finder paths in the group are available, the allotter in question is locked out of service, the afore-mentioned primary winding is connected to a busy tone generator and the above shunt removed from the secondary winding, whereby busy tone is superimposed on the above-mentioned ground supply conductor. This busy tone control arrangement avoids a common series contact in the battery supply to the lines which if it should fail to close would put all the lines out of service, and at the same time prevents an unnecessary load from being normally placed on the busy tone generator.

In the embodiment of the invention referred to above not only the individually trunked line finders but also the commonly trunked line finders of both kinds are supervised, as to all-trunks-busy conditions arising therein, by means of chain-controlled relays in the allotters, these relays causing the particular allotter to be taken out of service when no more finder paths are available in the group as just described. In the case of the commonly trunked line finders these chain arrangements must be such that artificial busying from finders of other groups is taken into account. In accordance with a further feature of the invention which is disclosed in the second embodiment shown herein such special chain arrangements may be avoided even in connection with allotter switches of the non-homing type by making the removal of the allotter from service dependent on the allotter switch moving its wipers, within the same allotting operation, unsuccessfully over the bank contacts corresponding to all finders accessible thereto.

It is yet another object of the invention to expedite the setting of the finders and reduce their wear by the provision of novel and improved means, whereby on the initiation of a call an idle finder is taken into use that rests on a home position which in the finder banks is nearer to the calling line than one or more other home positions.

Thus, in the second embodiment of the invention mentioned above in which there are provided individual as well as multipled line finders, the individual line finders are each provided with a plurality of alternative home positions. In accordance with a feature of the invention, upon the termination of each call through one of the individual finders, this finder is automatically advanced into the next following home position regardless of whether one or more finder switches are already resting in the last-mentioned position. The allotters which are of the battery searching type are arranged normally to make an allotment only from among those idle finders which rest on the normal position immediately preceding the switch positions or bank contacts accommodating the calling subgroup of lines, the term "preceding" as used herein referring to the order in which the various positions are reached by the switch wipers; but there are provided supervisory means which, in case no finder happens to rest in this particular home position, enable a given allotter to make an allotment from among the idle finders resting on another home position or in the described embodiment, the other of the two home positions provided. If all of the individual finders of the group have become busy, the allotter is enabled to allot one of the finders of the group which are trunked to a first numerical switch in multiple with finders of other groups. While these multipled finders are referred to in the detailed description of this embodiment as second choice or overflow finders it will be noted that, in a sense, there are provided, somewhat like in the first-mentioned embodiment finders of three different degrees of preference, namely (1) individually trunked finders that happen to rest at a given time in the home position preceding the bank contacts accommodating the subgroup of lines that happens to be calling, (2) individually trunked finders that happen to rest at that time in the other home position, and (3) multipled finders.

The invention both as to its organization and method of operation, together with other objects and features thereof, will best be understood by reference to the following specification taken in connection with the accompanying drawings. In these drawings:

Figs. 1–6 relate to the first embodiment and Fig. 1 and Figs. 7–9 to the second embodiment of the invention, Fig. 1 being common to both embodiments. More particularly:

Fig. 1 illustrates the line circuit used in both embodiments;

Fig. 2 illustrates the circuit of the line finder for the first embodiment;

Figure 3A:
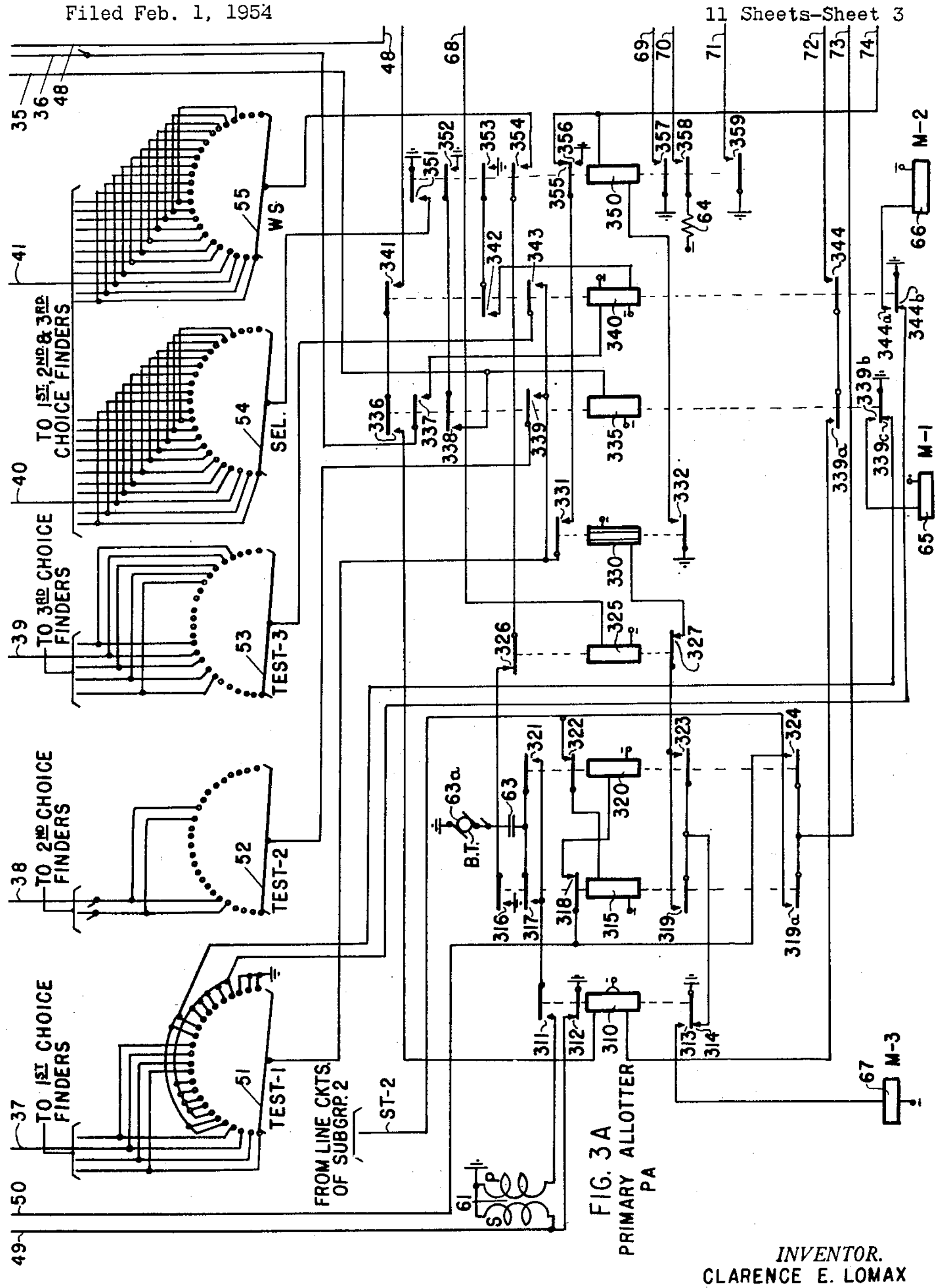
Figure 3B:
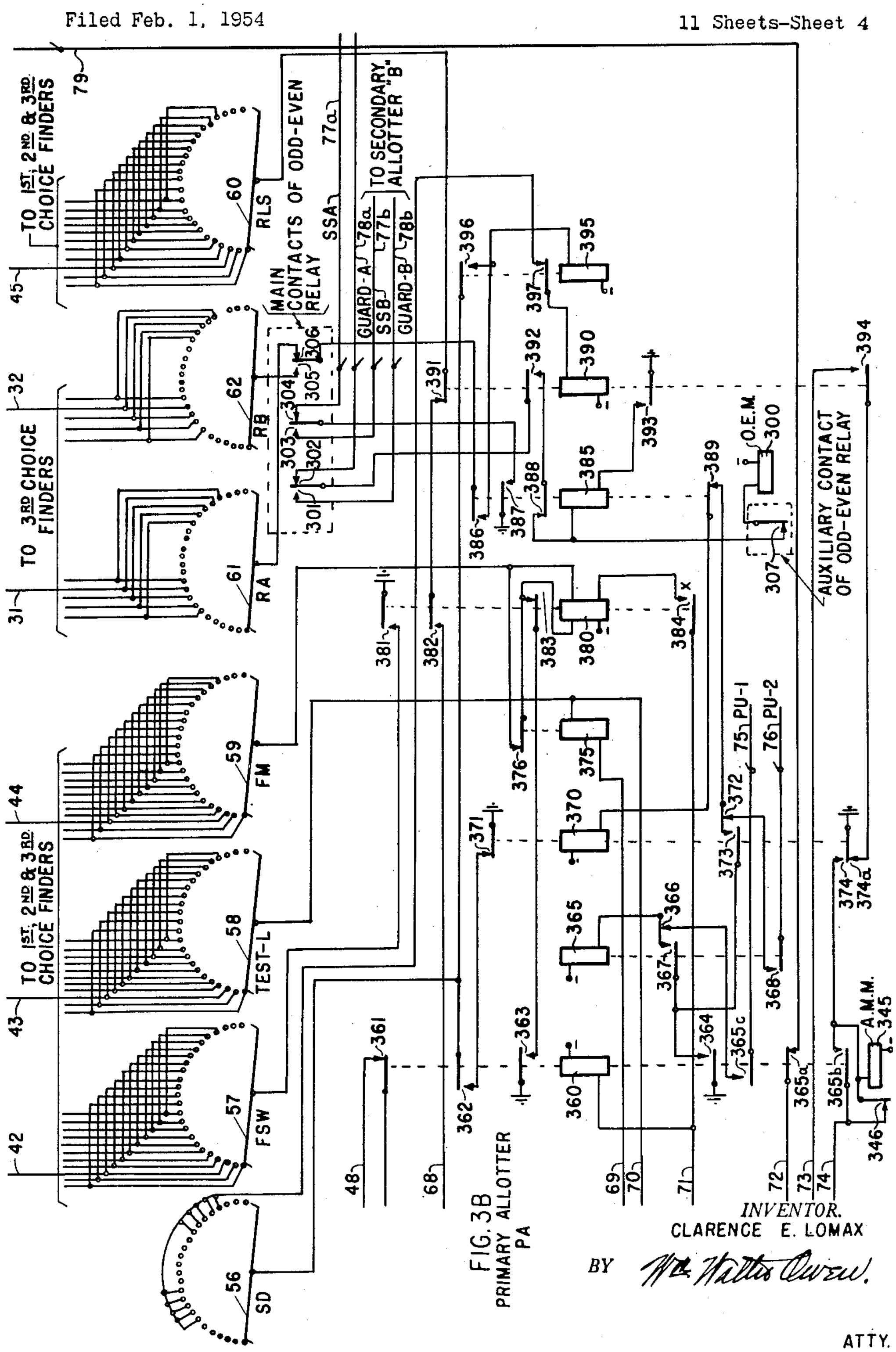
Figure 5:
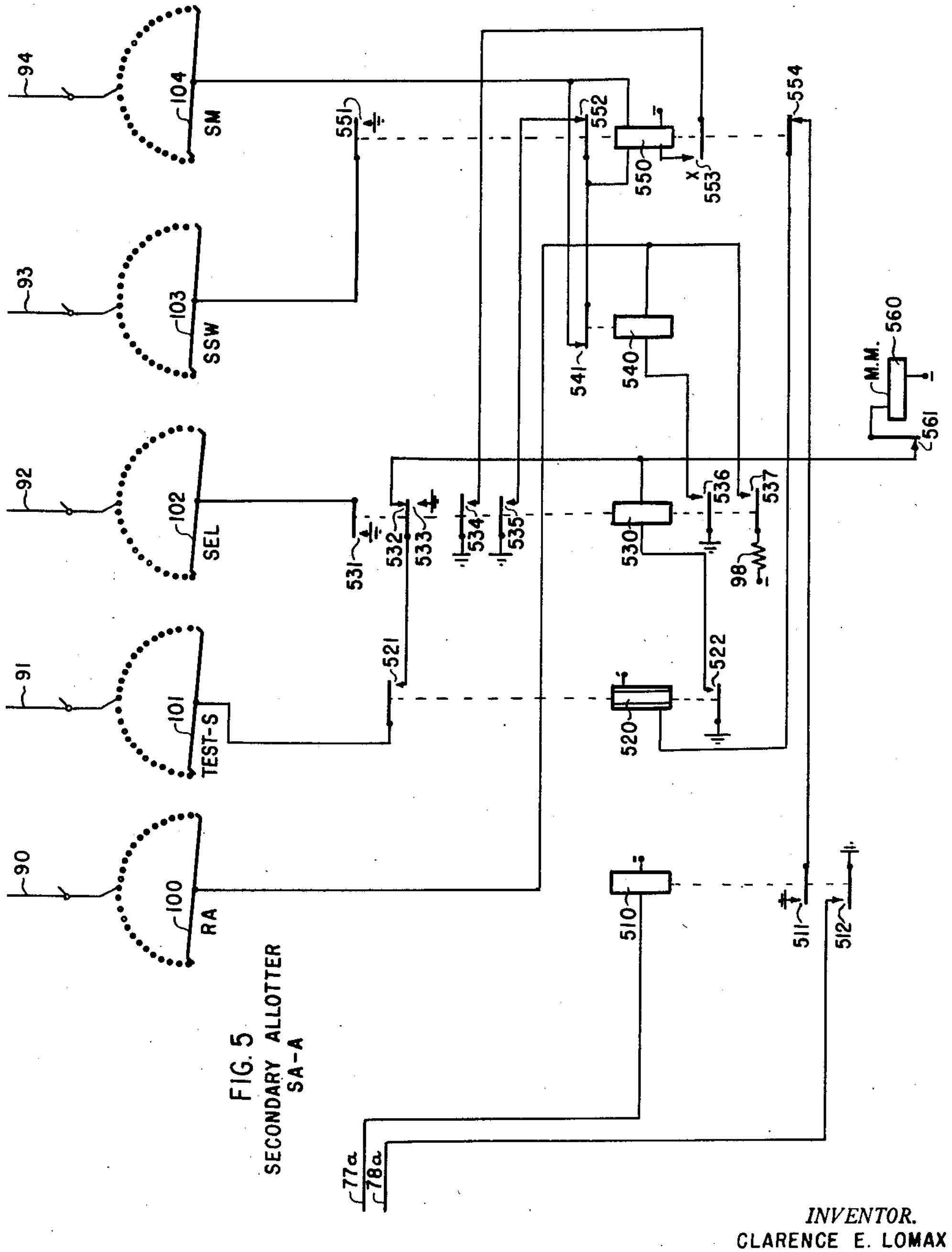
Figure 6:
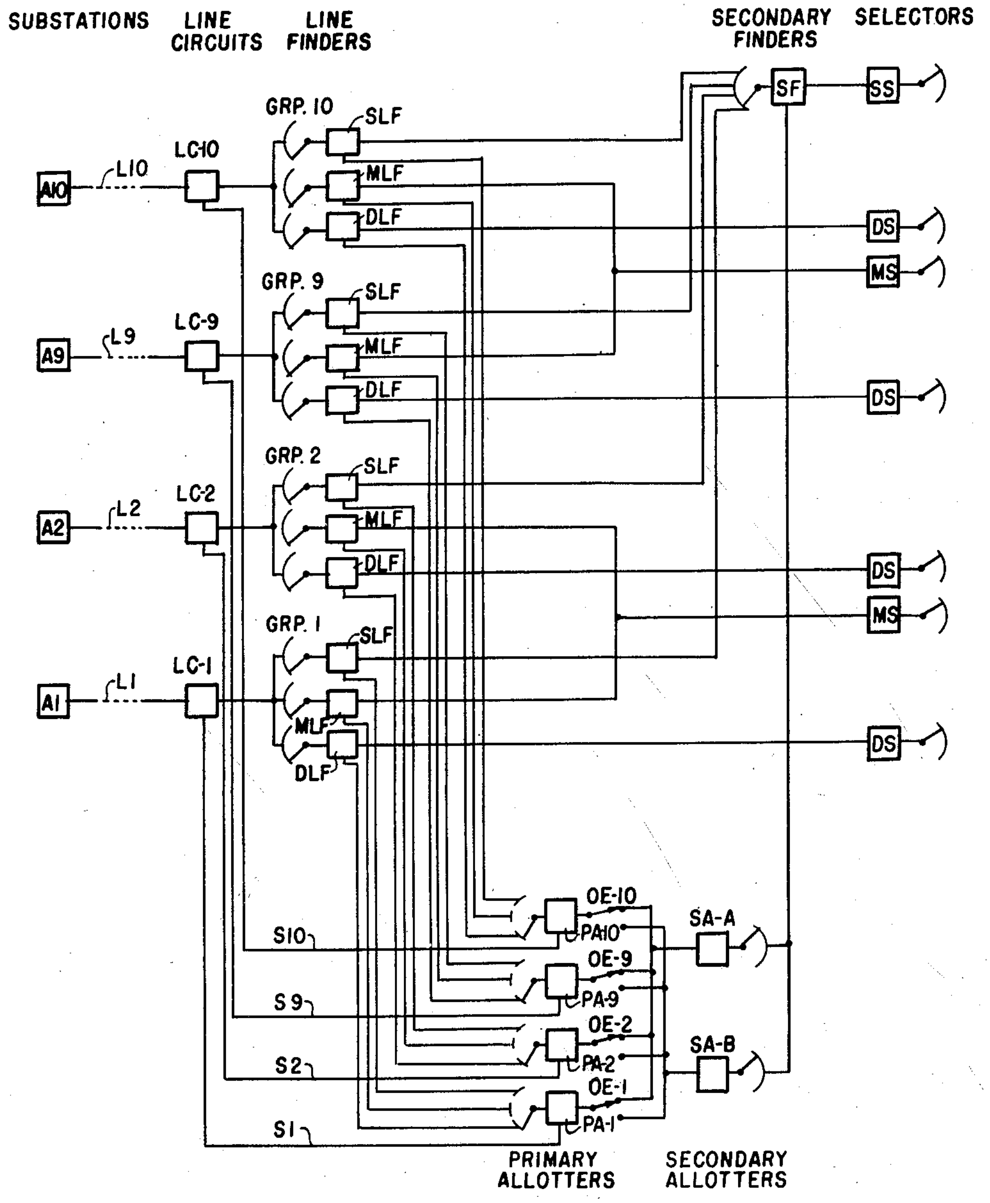
Figure 7:
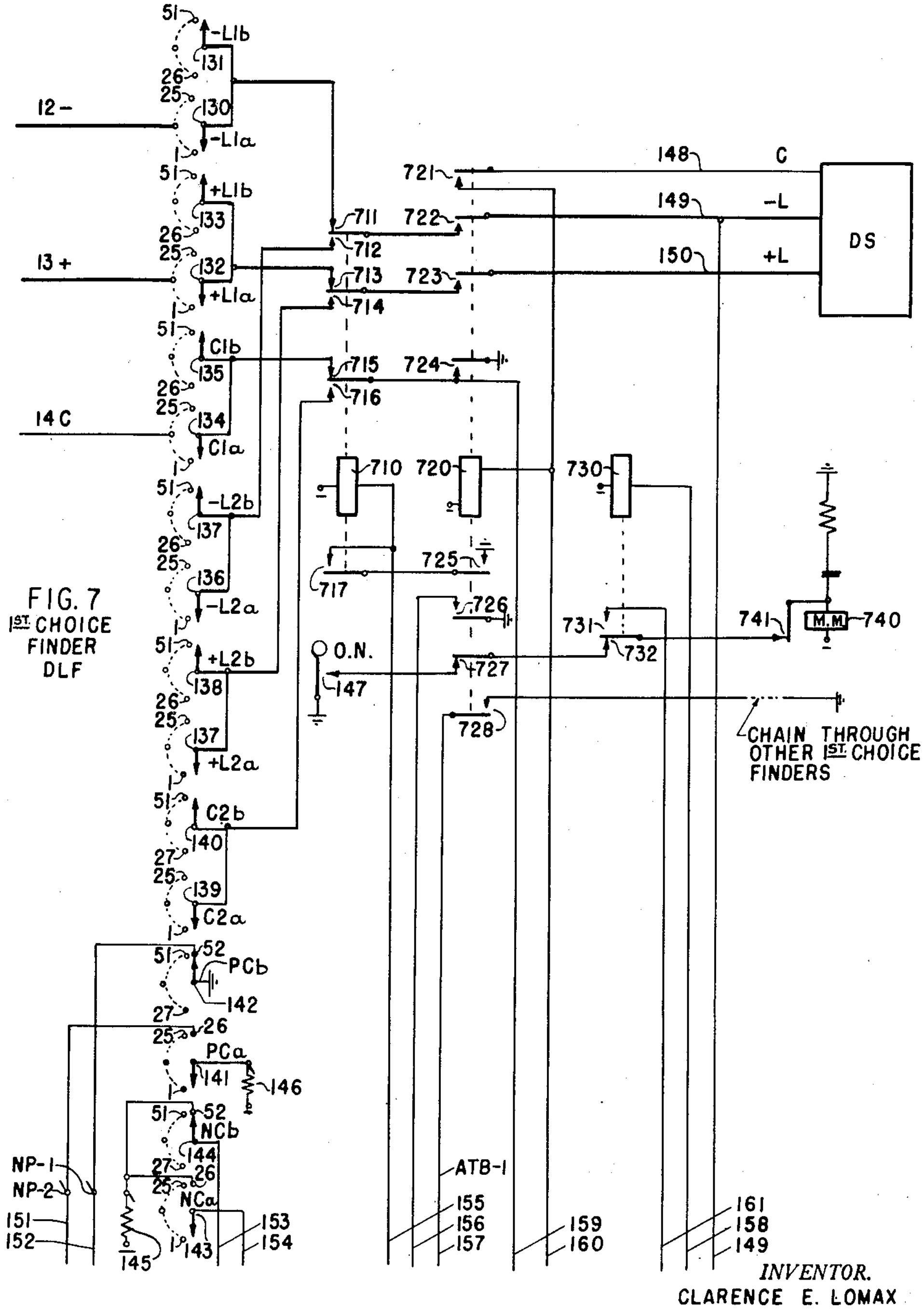
Figure 8:
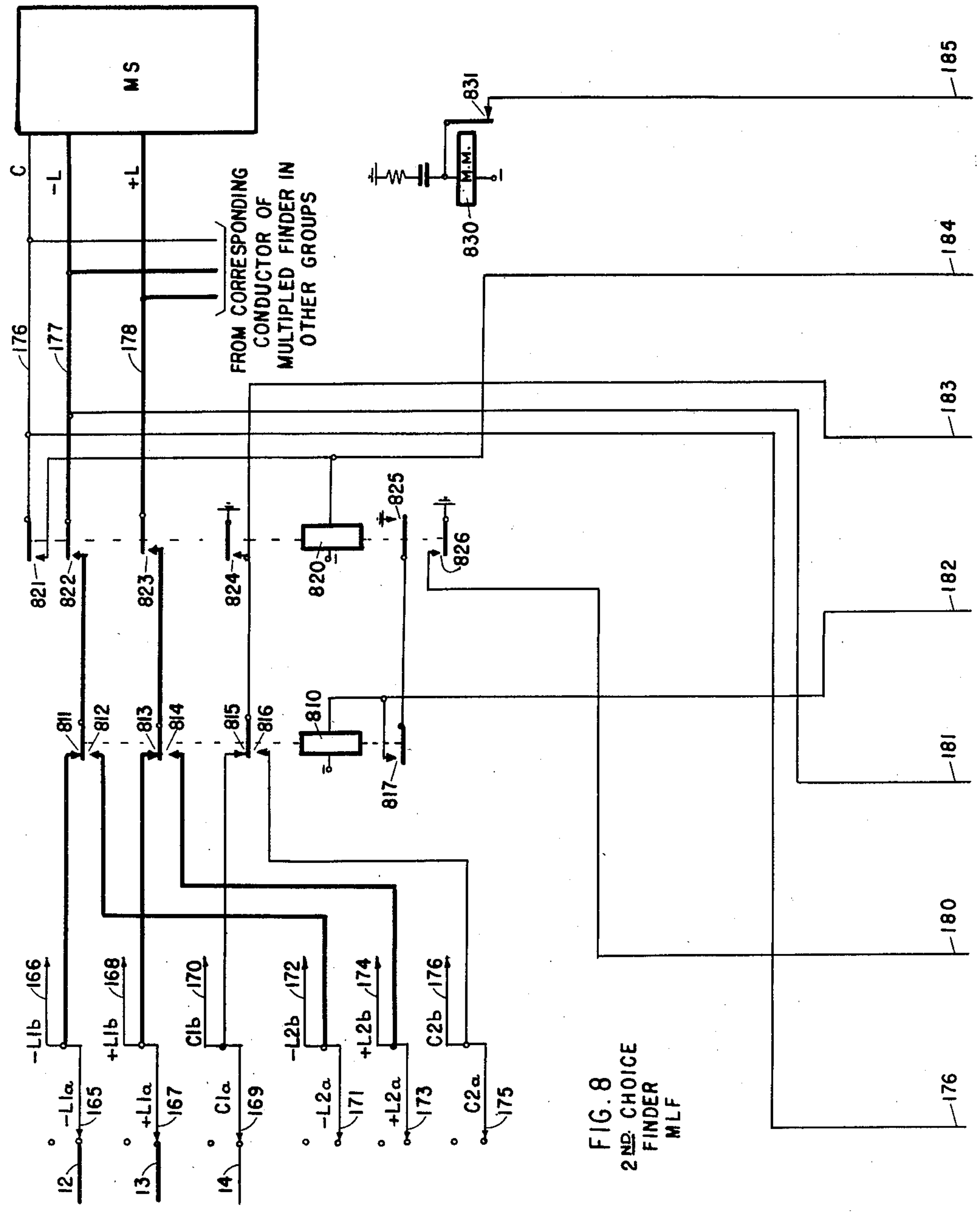

Figs. 3A and 3B when taken together, form a circuit diagram for the primary allotter of the first embodiment;

Fig. 4 is the circuit diagram of the secondary finder of this embodiment;

Fig. 5 illustrates the circuit of the secondary allotter in this embodiment;

Fig. 6 is a schematic trunking diagram illustrative of the first embodiment of the invention;

Fig. 7 illustrates the circuit for the individually trunked or first choice line finders of the second embodiment;

Fig. 8 shows the circuit for the multiplied or second choice line finders of the second embodiment;

Figs. 9A and 9B when taken together, constitute a circuit diagram for the allotter of the second embodiment;

Fig. 10 illustrates how the individual figures, 1–5 of the first embodiment should be placed with respect to each other to form a unified finder system; and Fig. 11 illustrates how the individual figures, 1 and 7–9, involved in the second embodiment should be placed in relation to each other to form a unified finder system.

A general description of the apparatus used in the two embodiments described hereinbelow will first be given. Referring first to Fig. 6 which illustrates the schematic trunking diagram for the first embodiment, there are indicated ten groups of subscribers' stations, only one substation, A1, A2, A9 and A10, being shown for each of groups one, two, nine and ten respectively. L1, L2, L9 and L10 are the subscribers' lines respectively connecting these substations with the associated line circuits LC1, LC2, LC9 and LC10 in the central office.

Corresponding to these ten groups of subscribers' lines and line circuits there are provided ten groups of line finders, each of these groups comprising a number of directly trunked finders DLF, of multipled finders MLF and of secondary trunked finders SLF, only one finder of each of these classes being shown in each of groups 1, 2, 9 and 10. As shown in Fig. 6 each of the direct finders has individually associated therewith a selector DS, each of the multiply trunked finders has associated therewith in multiple with a corresponding finder of the adjacent group, a selector MS and each of the secondary trunked line finders in all ten groups is trunked through a common group of secondary finders SF and of selectors SS each of the last-mentioned selectors being individually associated with a corresponding one of the secondary finders SF.

All finders are assumed to be fast-stepping rotary switches preferably of the type disclosed in United States Patent 2,522,715 which issued to K. W. Graybill et al. on September 19, 1950. As will be seen from Fig. 2 which shows the primary finders of all three classes referred to above each of these primary finders has two sets of three pairs of single ended wipers, the two wipers of each pair being strapped together and angularly staggered relatively to each other by 180° and, accordingly, arranged to successively engage their associated semi-circular contact rows. Thus, assuming a 25-point contact bank the capacity of each of these rotary-type finders is 100 lines or two subgroups of 50 lines. The secondary finders more particularly shown in Fig. 4 have only one set of five pairs of single-ended staggered wipers so that a maximum of fifty primary finders may be reached over the banks of the secondary finders.

The finders are allotted with the aid of primary allotters PA, one for each of the ten groups of line finders, and two secondary allotters SA–A and SA–B, the two last-mentioned allotters having common access to and serving all of the secondary finders provided. As shown in Figs. 3A and 3B, each primary allotter has access to the line finders of its associated group by way of a rotary-type stepping switch, preferably also of the design shown in Patent 2,522,715 and having a number of double-ended wipers and associated contact rows. It is assumed in Figs. 3A and 3B that these primary allotter switches have a 25-point contact bank; that there are provided four direct or first choice line finders DS, two multipled or second choice line finders MLF and five secondary trunked or third choice line finders SLF in each group; and that each of these 11 finders has two appearances in the contact bank of the associated primary allotter switch. The secondary allotter switches also may be of the design disclosed in the Graybill patent; as shown in Fig. 5, these switches have a number of double-ended wipers, it being assumed that a 25-point contact bank is used, whereby, for example, twenty secondary finders may readily be served by the secondary allotter switches. All finders and allotter switches are non-homing switches.

Each primary allotter has associated therewith an odd-even relay, OE1—OE10, Fig. 6, over a pair of whose main contacts a given primary allotter is individually connected with the start conductor of either the one or the other secondary allotter, depending on the availability of these two allotters, as more particularly shown in Fig. 3B. Also as shown in this figure and as described in more detail hereinbelow, the odd-even relay determines by means of another pair of its main contacts whether the allotted primary finder is marked as calling in the RA-bank or the RB-bank of the secondary finders, depending on whether secondary allotter SA–A or SA–B has been taken into use. In this way, primary-secondary cross-connections are prevented.

While in the trunking diagram of Fig. 6 only one starter conductor S1—S10 is schematically shown per line group, it should be noted that actually two such start conductors, one for each subgroup of 50 lines and being respectively designated ST–1 and ST–2 in Fig. 3A, are provided in each group. Each of these two start conductors has its own start relay, 320 and 315 respectively, connected thereto in the primary allotter, Fig. 3A, and a wiper selecting relay 210 in the allotted finder is operated or not depending on whether the one or the other start relay is operated, whereby the searching operation of the line finder is automatically confined to the subgroup calling.

In the second embodiment of the invention shown in Figs. 1 and 7–9 only direct, i. e. individual, finders DLF and mulpled finders MLF but no secondary trunked finders are employed, and because of the relative simplicity of this trunking arrangement it has been considered unnecessary to show a separate trunking diagram for this embodiment. In fact the trunking of the direct and the multipled line finders may, if desired, be the same as that shown in Fig. 6. However, any other grading scheme may be used for the multipled finders, both in the first and the second embodiment. Thus, instead of multipling corresponding second choice finders of two adjacent groups as assumed in Fig. 6, the second choice finders of any other number of groups, for example, four, may be multipled to a corresponding selector MS in any desired pattern. As in the case of Fig. 6 it has been assumed for the second embodiment that a total of eleven line finders are provided in each group and, as will be seen from the bank wiring of the allotter switches shown in Figs. 9A and 9B, these finders are divided into eight direct or first choice finders and three multipled or second choice finders.

In the case of this second embodiment, the circuits of the first and second choice finders slightly differ from each other and are respectively shown in Figs. 7 and 8. The principal difference between the two types of finders is that while the directly trunked finders DLF are of the homing kind, each in fact having a number of alternative home positions, it was considered unnecessary, for reasons set forth hereinbelow, to use homing in connection with the second choice finders MLF. Again, both the finder switches and the allotter switches are fast-stepping rotary-type switches, preferably of the design illustrated in the above-mentioned United States Patent 2,522,715 to K. W. Graybill et al.

The wiper and bank arrangement for the first choice finders DLF, Fig. 7, has been shown in the drawing in somewhat greater detail. Each of three switches has an upper set and a lower set of these pairs of single-ended staggered wipers each, viz. —L1*a*, —L1*b*; +L1*a*, +L1*b*; C1*a*, C1*b*; and —L2*a*, —L2*b*; +L2*a*, +L2*b*; C2*a*, C2*b*, the two individual wipers of each pair being strapped together and the contact rows engaged by these wipers having 25 contacts each as in the case of the first embodiment, so that each of these finders has access to a total of 100 lines. In the instant case, these 100 lines are divided into four distinct subgroups of 25 lines each. The first of these 25 line subgroups is assumed to be connected to contact rows —L1*a*, +L1*a*, C1*a* and has a start conductor ST–1 and a start relay 910, Fig. 9A, associated therewith. The second 25 line subgroup is connected to contact rows —L2*a*, +L2*a*, C2*a* and has a start conductor ST–2 and start relay 915 associated therewith. The third subgroup is, similarly, connected to contact rows —L1*b*, +L1*b*, C1*b* and associated with this subgroup are start conductor ST–3 and start relay 920. Subgroup four, finally, is connected to contact rows —L2*b*, +L2*b*, C2*b*, and this subgroup has start conductor ST–4 and start relay 925 associated therewith.

As shown in Fig. 7, each first choice finder switch has in addition, four special control wipers and associated contact rows, designated PC*a*, PC*b*, NC*a*, NC*b* respectively. Each of these special contact rows which serve to make the allotment of these finder switches dependent on the normal position in which they happen to rest, have an additional twenty-sixth contact, only this twenty-sixth contact being connected while the twenty-five regular bank contacts in each of these four contact rows are not used. In connection with this additional contact it may be mentioned that in the switch construction according to the above-named Graybill et al. patent, the wiper brush springs are mounted in the switch position immediately in back of the first bank positions proper; and that the design of this switch permits the accommodation of an additional set of bank contacts in this position of the wiper shaft at a point diametrically opposite the location of the wiper brush springs, as indicated in Fig. 7. Thus, when wipers PC*b* and NC*b* rest on the respective additional contact, numbered 52 in Fig. 7, all the *a* wipers are positioned immediately in back of their associated rows of contacts 1—25 as shown in Fig. 7; and when wipers PC*a* and NC*a* rest on the respective additional contact, numbered 26, all the *b* wipers are positioned immediately ahead of their associated rows of contacts 27—51.

It will be appreciated that cam or stud operated off-normal springs actuated in position 52 and 26 of the switch shaft could, if desired, be used instead of wipers PC*b*, NC*b* and their bank contacts 52, and wipers PC*a*, NC*a* and their bank contacts 26, respectively.

As explained in more detail hereinbelow wipers NC*a* and NC*b* in connection with battery connected resistance 145 cause the battery searching allotter to normally make an allotment only from among the idle finders Fig. 7, that rest in the normal position, 52 or 26, immediately preceding the 50 line subgroup calling, as determined by the operation of one of start relays 910, 915 or one of start relays 920, 925; and wipers PC*a* and PC*b* permit the release of supervisory relay 930, Fig. 9A, when either of these two home positions has become void, as it were of finders, as a result of which release the allotter is enabled to make an allotment from among idle finders, if any, resting in either home position regardless of whether a line in subgroups 1 or 2 or a line in subgroups 3 or 4 is calling. Also as described in more detail hereafter, when either of start relays 915 or 925 is operated as an indication that the call originated in either subgroup 2 or 4, the wiper selecting relay in the finder, 710 in Fig. 7 or 810 in Fig. 8, operates to confine the hunting of the finder to the second or upper instead of the first or lower set of contact rows. The homing circuit of the finder magnet 740, Fig. 7, is controlled by off-normal contact 147. The arrangement of the cams or studs, such as studs 65 in United States Patent 2,522,715 which actuate this contact is such that this contact is closed in all positions of the switch shaft except positions 52 and 26.

The second choice finders have two sets of pairs of single-ended staggered wipers engaging corresponding 25 point contact rows as shown in Fig. 8, the four subgroups of 25 lines each being connected to these contact rows as in the case of the first choice finders, Fig. 7. As the second choice finders are non-homing, special control wipers and banks or off-normal springs of any kind are not required in Fig. 8. As will be seen from Figs. 9A and 9B the allotter switches which also are of the non-homing type, have double ended wipers each of which engages a 25-point contact row except that the contact row engaged by wipers LO which is used for all-finders-busy supervision, has an additional twenty-sixth contact. Since no secondary finders and accordingly, no secondary allotters are used in the second embodiment, the allotters of Figs. 9A and 9B, of course, are not equipped with odd-even relays.

1. DETAILED DESCRIPTION OF FIRST EMBODIMENT

Referring more particularly to Figs. 1–6 a detailed description of the operation of the line finder system disclosed in these figures will now be given.

*Call through direct line finder*

The line circuit Fig. 1 is shown as belonging to the first subgroup of 50 lines of a given 100 line group, the line circuits of this 50 line subgroup all being wired to start conductor ST–1. Assuming the subscriber at the associated substation A, Fig. 1, lifts his handset from the cradle to initiate a call, the loop is closed over subscriber's line 11 which causes the operation of line relay 120 over the following circuit: ground, contact 312, Fig. 3A, LG conductor 49, contact 112, Fig. 1, loop over subscriber's line 11, contact 111, winding of relay 120, battery. At contacts 123, 122 relay 120 in operating transfers CN conductor 15 from the winding of cut-off relay 110 to ground, thereby to mark this line circuit as busy in the connector banks not shown; at contacts 121 relay 120 connects the winding of cut-off relay 110 to finder test conductor 14; and at 124 connects ground to common start conductor ST–1.

In the primary allotter, Fig. 3A, start relay 320 which is associated with the first subgroup of 50 lines operates in a circuit extending from ground on ST–1 conductor 50 through contact 318 and the winding of relay 320 to battery. Relay 320, upon operating, at 321 prepares a circuit to the primary winding P of busy tone induction coil 61; at 322 disconnects the winding of the other start relay, 315; at 324 prepares a locking circuit for itself which, however, is closed only on calls involving secondary-trunked line finders; and at 323 closes the following circuit for auxiliary start relay 330; ground, contacts 314, 323 and 327, winding of relay 330, battery. When relay 330 operates it places the winding of relay 350 in a circuit extending from ground at contact 332 through the winding of relay 350, conductor 74, interrupter contact 346, winding of allotter switch magnet 345 to battery; and at contact 331 connects the Test–1 wiper 51 of this allotter switch by way of contact 355 to the junction point between the winding of relay 350 and that of allotter magnet 345.

The primary allotter, Figs. 3A and 3B, is of the post-selecting, absence-of-ground searching type and has testing access to the three classes of line finders by way of wipers Test–1, Test–2 and Test–3 respectively. Let it first be assumed that at least one of the first choice or directly trunked line finders DLF is idle and that the finder shown in Fig. 2 is wired as a first choice finder. As shown in this figure, conductors —, + and C of the trunk outgoing from this finder are then individually connected to an associated selector DS indicated schematically in Fig. 2; the make spring of contact 226 is wired to guard conductor 37 which is connected to contacts 3 and 14 in the Test–1 bank of the allotter switch; and the make spring of contact 228 is wired to conductor 35.

The contacts such as 228 of all first-choice finders are connected into a chain circuit and the aforementioned conductor 35 becomes grounded through this contact chain when all DLF finders are busy, i. e. when the switching relays 220 of all these direct finders are operated. As long as any of the direct finders such as that shown in Fig. 1 is idle this chain circuit is incomplete and relay 335, Fig. 3A, accordingly de-energized so that the operating circuit of relay 340 is likewise open, viz. at 337, and this last-mentioned relay accordingly also in released condition. As a result, ground is maintained at contact 339*c* on the Test–1 bank contacts corresponding to the two second-choice finders and is also maintained at contact 344*b* at the Test–1 bank contacts of the five third-choice finders. Under this condition the primary allotter switch while hunting for an idle line finder as described below, is automatically advanced over all the contacts of this bank which correspond to the second- and third-choice finders. Furthermore, test wipers Test–2 and Test–3 are held disconnected from test wiper Test–1 at contacts 339 and 343 respectively.

As long as the allotter switch wiper Test–1 encounters ground, the corresponding ground potential at the right hand terminal of relay 350 keeps this relay shunted to prevent the relay from operating, and at the same time energizes the self-interrupter circuit of allotter switch magnet 345 sufficiently to cause this magnet to operate. This self-interrupter circuit may be traced from ground at a contact such as 226 of a busy first-choice finder, or else from ground at contact 339*c* or 344*b*, through the Test–1 wiper of the allotter switch, contacts 331 and 335, conductor 74, contact 346, winding of magnet 345, to battery.

In this manner the primary allotter switch is automatically advanced until Test–1 wiper 51 engages a bank contact from which guarding ground is absent. Assuming that the first idle-direct-finder position reached by the allotter switch is position 3 to which the first-choice line finder shown in Fig. 2 is connected, the self-interrupting action is stopped in position 3 of the allotter switch and relay 350 is permitted to operate in series with magnet 345 in its above traced circuit. Because of the relatively high resistance of the winding of relay 350 magnet 345 cannot reoperate in this circuit.

When allotter test relay 350 operates ground is connected to the negative line conductor incoming to selector DS, over the following circuit: ground, contact 351, SEL wiper 54 of the allotter switch in position 3, conductor 40, negative line conductor of selector DS. The selectors of all three types, that is selectors DS, MS and SS may be of any conventional type, reference being made for example to the selector shown in Fig. 2 of United States Patent 2,214,908 which issued to C. E. Lomax et al. on September 17, 1940. As may be seen from this patent, connection of ground to the negative line conductor, C116 in the Lomax patent, incoming to the selector causes the operation of the selector line relay, such as R260 in Patent 2,214,908, and this in turn causes the operation of the selector hold relay, such as relay R270, whereby ground is returned to the incoming test conductor such as conductor C118 of the Lomax patent. Upon the operation of relay 350 the Test–1 wiper is disconnected from the windings of relay 350 and magnet 345 at contact 355 and instead connected to ground at contact 356. At contact 357 relay 350 closes ground to the left hand terminal of common finder test relay 375, Fig. 3B, whereby at contact 358 a pre-energizing circuit is closed for this relay which may be traced from ground at contact 357 through conductor 69, winding of relay 375, conductor 70, contact 358 and resistance 64 to battery. Relay 375 is not operated in this circuit but due to its pre-energization this relay operates instantly as soon as battery is encountered by Test–L wiper 58 as hereafter described. At 359 a circuit is closed to the winding of relay 360 by way of conductor 71.

Relay 360, upon operating, at its contacts 361 and 365a opens the operating circuits extending over the two windings, respectively, of all-line-finders-busy relay 310; and at contact 363 closes the following self-interrupting circuit for finder magnet 230: ground, contacts 363, 383, 376, FM wiper 59 in position 3, conductor 44, interrupter contact 231, winding of magnet 230, battery. Assuming that the wipers of the line finder Fig. 2 rest on the bank contacts corresponding to the calling line, finder test relay 375 in the allotter operates before finder magnet 230 has time to attract its armature, namely by way of the following circuit: ground, contact 357, conductor 69, winding of relay 375, Test–L wiper 58 in position 3, conductor 43, contact 215, C–1 wiper 24, test conductor 14, contact 121, winding of line cut-off relay 110, battery. When relay 375 operates in this circuit it immediately opens the short circuit across the upper winding of relay 380 at contact 376 so that this relay is permitted to operate through its upper winding in series with the winding of magnet 230. Finder magnet 230 cannot operate in this circuit because of the comparatively high resistance of the upper winding of relay 380.

If the line finder Fig. 2 rests on a line other than the calling line at the time the finder magnet circuit is closed at contact 363 test relay 375 is prevented from operating for the time being because of the absence of battery on test conductor 14, and finder magnet 230 is actuated over its above-traced self-interrupting circuit. The finder switch is automatically advanced due to the self-interrupting action of magnet 230 until the calling line is reached, at which time test relay 375 operates by way of C–1 wiper 24 or 25 as just described to place the upper winding of relay 380 in series with magnet 230, thereby to operate the last-mentioned relay and stop the finder.

When relay 380 operates it closes a locking circuit for itself which extends from ground through contact 359, conductor 71, preliminary or X contact 384, and the lower winding of relay 380 to battery; at contact 383 the relay opens the above circuit extending through the upper winding of relay 380 and the winding of finder magnet 230 in series; at 382 the relay closes a point in the circuit of allotter release relay 325; and at 381 it closes the following circuit for finder switching relay 220: ground, contact 381, FSW wiper 57 in position 3, conductor 42, winding of relay 220, battery.

Switching relay 220, in operating, at its contacts 221 and 222 switches the finder wipers through to the incoming talking conductors of selector DS, whereby the loop circuit is extended to the selector line relay by way of line conductors 12 and 13, finder wipers 16 and 20 or 17 and 21 as the case may be, contacts 211 and 213, contacts 221 and 222, incoming talking conductors, — and +, of selector DS, to battery and ground through the two windings of the selector line relay, such as R260 of the Lomax patent, respectively. At contact 223, ground returned from selector DS over the test conductor is further extended via contact 215 to finder test wiper 24 or 25, thereby insuring the operation and the holding of line cut off relay 110 and at the same time, causing the winding of relay 375 in the allotter to be shorted so that this relay releases. At contact 224 relay 220 locks to the last-mentioned ground on the test conductor; at contact 228 it closes a point in the all-direct-finders-busy chain; at contact 226 it connects guarding ground to guard conductor 37 to mark this line finder as busy in the Test–1 bank of the allotter switch; and at contact 227 it completes the following circuit for release relay 325: ground, contact 227, conductor 45, RLS wiper 60 of the allotter switch in position 3, contacts 391 and 382, conductor 68, winding of relay 325, battery. Relay 325, in operating, at its contact 327 causes the slow release of relay 330 which in turn lets relay 350 restore. As a result relays 360 and 380 are also permitted to release, and relay 325 is allowed to restore due to its circuit being opened at contact 382.

When line cut off relay 110 operates, it locks to ground on the finder test wiper by way of its preliminary or X contact 113 and test conductor 14 and at contacts 111 and 112 clears the line from battery and ground connections in the line circuit respectively. Line relay 120 accordingly releases. Ground at contact 122 is replaced by ground on test conductor 14 by way of contacts 113 and 123 so that this line continues to be marked busy in the connector banks. At contact 124 ground is disconnected from common start conductor ST–1 so that, if no other call is waiting in this 50 line subgroup, start relay 320 releases. The allotter has thus been returned to its normal condition.

The connection is now further extended under the control of the calling subscriber's dial in any known manner, for instance as described in Lomax Patent 2,214,908. When the calling subscriber A replaces his handset at the end of the call the release of the selector line and holding relays causes holding ground to be removed from the test conductor incoming to the selector so that line cut off relay 110 and switching relay 230 are permitted to restore. The finder selector link thus becomes available again for use in other calls.

If a call is originated in a line circuit of the second rather than first subgroup of 50 lines, start conductor ST–2 rather than ST–1 is grounded and therefore start relay 315 operated instead of relay 320. Relay 315 is equipped and wired in a way similar to relay 320 except that it has an additional contact 316 which upon closure incident to the operation of relay 315 prepares a point in the operating circuit of wiper selecting relay 210 of the allotted line finder. When the allotter has found an idle finder and allotter test relay 350 operates as above described, the circuit for wiper selecting relay 210 is completed and this relay operates over the following circuit path: ground, contacts 316, 326, 354, WS wiper 55 of the allotter switch, for example in position 3, conductor 41, winding of relay 210, battery. Relay 210, in operating, at its contact 217 prepares a locking circuit for itself which is later completed at contact 225 of switching relay 220. At its contacts 211, 212; 213, 214; and 215, 216 relay 210 transfers the finder talking and test conductors from the upper set of wipers, —L1, +L1, C1, to the lower set of wipers, —L2, +L2, C2, so that the searching operation of this finder under this condition is confined to the lower instead of the upper test bank, this lower bank giving access to the second subgroup of 50 lines. In all other respects the operation of the circuit is the same as described above in connection with a call from the first subgroup.

Relays 365 and 370, Fig. 3B, and pulse conductors PU1 and PU2 are provided for "kicking off" the allotter switch in case the allotted finder fails to connect up with a calling line within a given time. The two pulse conductors are connected at their other end to a common timer, not shown, of any well known type which periodically applies a short ground pulse to PU2 conductor 70 and shortly thereafter to PU1 conductor 75 at suitable time intervals, for example once every few seconds. When relay 360 operates incident to seizure of an idle finder as above described it connects PU1 conductor 75 to the winding of relay 365 by way of contacts 365*c* and 366, and prepares a locking circuit for both relays 365 and 370 at contact 364. When a PU1 pulse is received from the common timer, relay 365 operates by way of contacts 365*c* and 366. Relay 365, upon operating, at contact 368 connects PU2 conductor 70 to the winding of the other timing relay 370 by way of contacts 372 and 389; at 367 relay 365 places itself into a holding circuit extending to ground at contact 364 and shortly thereafter at contact 366 disconnects its winding from the PU1 conductor. Assuming that the allotted finder has failed to find a calling line and the allotter, accordingly, has not been released by the time the PU2 pulse is received, the last-mentioned pulse causes the operation of relay 370 by way of contact 368, which is still closed due to the failure of relays 360 and 365 to restore, and through contacts 372 and 389. Relay 370, in operating, at 373 locks to ground at 364; at 372 disconnects itself from the PU2 conductor; and at 374 closes an obvious circuit to allotter switch magnet 345, at the same time causing the winding of relay 350 to be shorted by way of contact 365*b* and conductor 74. When relay 350 releases it lets relay 360 restore and this relay in turn opens the locking circuits of timer relays 365 and 370 so that these two relays are also restored to normal. At contact 374 ground is disconnected from allotter switch magnet 345 and this magnet upon releasing advances the allotter switch to the next-following position, in the instant example position 4. When interrupter contact 346 re-closes relay 350 is again placed in series with the winding of allotter switch magnet 345 so that this test relay operates if the finder connected to position 4 is idle and magnet 345 is operated in its self-interrupting circuit if this finder is busy. The finder allotted as a result of this searching action is then started in search of the calling line as described above for the finder shown in Fig. 2.

*Call through a multipled line finder*

When all directly trunked finders DLF have been taken into use, the all-trunks-busy chain associated with these finders is completed and relay 335 in the allotter operates over the following circuit: ground, contacts 228 of all direct finders in series, conductor 35, winding of relay 335, battery. Relay 335, upon operating, at its contact 338 prepares a locking circuit for itself which is completed at contact 352 of allotter test relay 350 when this relay subsequently operates upon the origination of a call. In this manner the release of relay 335 incident to one of the direct finders becoming idle is prevented while the allotter is engaged in serving one of the second choice finders. At contact 337 relay 335 closes a point in the operating circuit of all-second-choice-trunks busy relay 340; at contacts 336 and 339*a* relay 335 closes a point in the operating circuit extending through the upper and lower winding respectively of all-trunks-busy relay 310; at contact 339*b* relay 335 operates M1 meter 65 over an obvious circuit, this meter thus being arranged to indicate the number of times an all-direct-finders-busy condition occurs in the group in question; at contact 339*c* the relay disconnects ground from the contacts in the Test–1 bank of the allotter switch which correspond to the two second choice finders, thereby preventing the allotter switch from being automatically advanced over the corresponding positions regardless of the idle condition of these finders; and at contact 339 it connects wiper Test–2 in parallel with wiper Test–1 so that the allotter switch is now enabled to test the condition of the guard conductors of the two second choice finders, these conductors being accessible over the Test–2 wiper in positions 5, 6 and 16, 17 of the allotter switch.

As indicated in Fig. 2 when the line finder shown in this figure is used as a second-choice finder MLF, conductors —, + and C of the trunk outgoing therefrom are connected to a selector MS in multiple with the corresponding conductors 28′, 29′ and 30′ of the trunk outgoing from the corresponding second-choice finder of another group. As further shown in Fig. 2, the make spring of contact 226 of switching relay 220 is wired to a guard conductor 38 instead of 37 and the chain circuit through the second-choice finders is connected to a conductor 36 rather than 35. This conductor 36 is connected at its other end through a contact such as 337 of the upper winding of an all-second-choice-trunks-busy relay such as 340 in each of the two allotters involved in the multipling arrangement, as indicated by the multiple symbol shown on conductor 36 in Fig. 3A. As indicated in Fig. 2, each chain contact, i. e. contact 228 of each second choice finder of the instant group, is multipled by way of paralleling conductors such as 33 and 34 with contact 228 of the corresponding second-choice finder of the multipled group. In this fashion ground is closed to conductor 36 whenever all selectors MS become busy regardless which one of the two finders serving a given selector MS gave rise to its busy condition; and when ground is thus connected to conductor 36, this ground causes the operation of the all-second-choice-trunks busy relay such as 340 in both allotters affected by the multipling arrangement, depending only on whether the circuit of this relay is prepared in the particular allotter at a contact such as 337 of the corresponding all-first-choice-busy relay. Thus, the fact that all selectors MS have been taken into use results in the operation of relay 340 only of a group whose direct finders are all busy at the time.

The operation of the circuit in the case of an all-second-choice trunks busy condition will be described in the following section. As this point it will be assumed that the second-choice finder shown in Fig. 2 is idle in which case ground is absent from guard conductor 38. Accordingly, when the allotter Figs. 3A and 3B is started upon the origination of a call in the associated group, allotter test relay 350 is permitted to operate in series with allotter switch magnet 345 when the last-mentioned switch has reached either position 6 or 17. When this relay operates ground is connected through contacts 356, 331, 339 and Test–2 wiper 52 in position 6 or 17, to guard conductor 38 and since this guard conductor is multipled to the corresponding Test–2 bank contact in the allotter switch of the other group, the second-choice selector MS shown in Fig. 2 is instantaneously guarded against seizure by the other allotter. This guarding condition is subsequently maintained with respect to both allotters upon closure of contact 226 when switching relay 220 is operated in the manner described hereinbefore.

After the second-choice finder MLF, Fig. 2, has thus been switched through to selector MS, the allotter is released in the manner explained above in connection with first choice finder DLF, and the further setting up of the call and the release of the connection at the end of the conversation also take place in a manner similar to that described above.

*Call through a secondary-trunked line finder*

When all direct line finders DLF and all multipled line finders MLF are busy, relay 340 Fig. 3A in the allotter of that group operates as explained above. This relay at contact 342 closes a locking circuit for itself if and when the allotter is in use and contact 353 of relay 350 accordingly in actuated condition. At contacts 341 and 344 relay 340 closes another point in the circuit of the upper and lower windings respectively of all-finder-paths-busy relay 310; at 344*a* the relay closes an obvious circuit to M2 meter 66 which thus registers the number of times all first- and second-choice finders are simultaneously busy in this group, at 344*b* the relay removes ground from the third choice contacts in the Test–1 bank of the allotter switch to prevent the allotter switch from automatically stepping over all the positions corresponding to third choice finders; and at contact 343 relay 340 connects wiper Test–3 of the allotter switch in parallel to wipers Test–1 and Test–2 of the switch, thereby enabling the switch to hunt for an idle third choice finder.

It will be seen from Fig. 2 that the third choice finders SLF are of a circuit design similar in most respects to that of the first and second choice finders. However, as shown in Fig. 2 the third choice finders instead of being individually associated with a given selector are each connected over conductors such as 28 to 32 to the banks of the secondary finders of which one is shown in Fig. 4. These five conductors include, in addition to the two talking conductors and the test conductor, two conductors RA and RB the other ends of which are accessible over the RA and RB banks respectively of the allotter switch Fig. 3A. The all-finders-busy chain in the case of the third choice finders is connected to ATB–3 conductor 48; and contact 226 of switching relay 220 is wired in the case of these finders to guard conductor 39 the other end of which is connected to two positions, 10 and 21, in the Test–3 bank of the allotter switch.

Assuming then that a call is initiated in the group shown during an all first- and second-choice finders busy condition, and that the third choice finder shown in Fig. 2 is idle and is the first idle finder of this class encountered by the allotter switch, test relay 350 in the allotter is operated in either of these two positions of the allotter switch to arrest this switch in the manner explained in the preceding two sections. When relay 360 operates following the operation of test relay 350 the following circuit for relay 390 is closed over SD wiper 56 and the corresponding bank contact 10 or 21 of the allotter switch: ground, contacts 371, 362, SD wiper and bank, contact 397, winding of relay 390, battery. It will be noted that the circuit of relay 390 which serves as a start relay for the odd-even relay is prepared by the SD wiper and bank of the allotter switch only in those positions of this switch which correspond to third choice finders.

Relay 390 upon operating at its contact 391 opens a point in the circuit of release relay 325. At contact 394 relay 390 closes a locking circuit to allotter start relay 315 or 320 extending from ground at contact 374*a* by way of contact 394 and conductor 73, locking contact 324, contact 318 to the winding of relay 320 and battery, or locking contact 319*a* and contact 322 to the winding of start relay 315 and battery as the case may be. Relay 390 thus locks the allotter start relay independently of the line circuit, thereby preventing premature release of relay 330 in case finder SLF finds the calling line before this finder in turn has been found by the secondary finder, as explained hereinbelow. At contact 392 relay 390 connects the armature of main contacts 301, 302 of the odd-even relay to the junction between the left terminal of test relay 385 and the upper terminal of magnet 300 of the odd-even relay, the auxiliary or interrupter contact 307 of the odd-even relay being included in the connection to magnet 300. At contact 393 relay 390 closes the following circuit for test relay 385 and magnet 300 in series: ground, contact 393, winding of relay 385, interrupter contact 307, magnet 300, battery.

As will be seen from Figs. 3B and 5 the guard and start conductors of secondary allotter SA–A are connected to main contacts 302 and 304 respectively of the odd-even relay, and the guard and start conductors of secondary allotter SA–B are connected to main contacts 301 and 303 respectively of the odd-even relay. Assuming first that with the odd-even relay contacts in the position shown in Fig. 3B secondary allotter SA–A is idle at the time relay 390 operates, ground is absent from Guard–A conductor 78*a* and as a result relay 385 is permitted to operate in series with magnet 300 in the above-traced circuit. Since the winding of relay 385 is of comparatively high resistance magnet 300 does not operate in this circuit. Relay 385 in operating at contact 388 disconnects the afore-mentioned junction point from the armature associated with contacts 301, 302 of the odd-even relay; at contact 389 opens a point in the circuit of timing relay 370, thereby preventing the operation of this relay as long as relay 385 is operated; at 386 connects the winding of relay 395 by way of main contact 306 to the RA wiper of the allotter switch; and at contact 387 closes the following circuit to start relay 510 of secondary allotter SA–A Fig. 5; ground, contact 387, odd-even relay contact 304, start conductor 77*a*, winding of relay 510, battery.

When secondary start relay 510 operates ground is connected at 512 to Guard–A conductor 78*a*, whereby this particular secondary allotter is marked as busy to other primary allotters, and at contact 511 a circuit is closed to relay 520 by way of contact 554. Relay 520, upon operating, at contact 521 connects the Test–S wiper 101 of the secondary allotter switch to the junction between the right hand terminal of the winding of test relay 530 and the winding of magnet 560 of the secondary allotter switch, the connection to this last-mentioned magnet extending over interrupter contact 561; and at contact 522 closes the following circuit: ground, contact 522, winding of test relay 530, interrupter contact 561, magnet 560, battery.

If the secondary allotter switch happens to rest on a busy secondary finder, ground is connected to the guard conductor of that finder, causing the operation of magnet 560 by way of Test–S wiper 101, contacts 521, 532, 561 and magnet 560 to battery. The same ground keeps test relay 530 shunted and thus prevents this relay from operating. Magnet 560 attracts its armature, thereby opening its interrupter contact 561 which in turn opens the circuit through the winding of magnet 560, thus causing the release of this magnet. The secondary allotter switch accordingly is advanced into its following position. The stepping action of the switch continues until a secondary finder characterized by absence of ground on its guard conductor is found. Assuming the secondary finder SF shown in Fig. 4 to be the first idle secondary finder encountered by the allotter switch, the last-mentioned switch is arrested in position 13 and test relay 530 permitted to operate in series with magnet 560 in the above traced circuit. Magnet 560 cannot operate in this circuit as the winding of relay 530 is of relatively high resistance.

Test relay 530 in operating, at contact 531 connects ground by way of SEL wiper 102 in position 13 and conductor 92 to the negative talking conductor incoming to selector SS, this last-mentioned selector being associated with the particular secondary finder SF shown in Fig. 4. The line relay not shown in selector SS accordingly operates, causing holding ground to be returned over test conductor 97 in the manner explained above in connection with selectors DS and MS. At contacts 532, 533 relay 530 transfers wiper 101 from the afore-mentioned junction point to ground, thereby guarding secondary finder SF from seizure by the other secondary allotter; at contacts 536 and 537 a preenergizing circuit is closed for test relay 540; at 534 a locking circuit is prepared for the lower winding of relay 550 and 535 the following circuit closed for the winding of finder magnet 420: ground, contacts 535, 552, 541, SM wiper 104 in position 13, conductor 94, interrupter contact 421, winding of magnet 420 to battery. By virtue of this last-traced interrupter circuit the secondary finder SF is automatically advanced in search of third choice line finder SLF, this last-mentioned line finder being marked as calling by battery connected to RA conductor 31 through the winding of relay 395. It will be understood that in this manner an idle secondary allotter such as SA–A searches for an idle secondary finder, and that subsequently the allotted secondary finder searches for the marked third choice line finder; and that the first or both of these two operations take place simultaneously with the last-mentioned third choice finder searching for the calling line.

Before proceeding with the description of the further operation of line finder SLF and secondary finder SF, an explanation will first be given of the functioning of the odd-even relay Fig. 3B in case secondary allotter SA–A is busy at the time relay 390 operates. In that case ground connected to Guard–A conductor 78*a* at contact 512 will cause the operation of magnet 300 of the odd-even relay in the following circuit: ground, contact 512, conductor 78*a*, odd-even relay contact 302, contacts 392, 388 and 307, winding of magnet 300, battery. Ground on conductor 78*a* also shunts test relay 385, thereby preventing this relay from operating at this time. Odd-even relay magnet 300 in attracting its armature opens its auxiliary contact 307 so that the last-traced circuit of this magnet is broken and the armature of magnet 300 released.

As shown in the above-mentioned Stehlik patent and Sengebusch patent applications the main contacts of the odd-even relay, by virtue of a locking mechanism interposed between the armature and the main contacts of this relay, are caused to change their condition only when the armature of the relay has thus gone through a complete operating and releasing cycle; contacts 302, 304, 306 which are associated wiith secondary allotter SA–A accordingly are now opened and contacts 301, 303 and 305 which are associated with allotter SA–B, are closed. Assuming that this other secondary allotter, SA–B, is idle, ground is absent from Guard–B conductor 78*b* and as a result relay 385 is permitted to operate in series with magnet 300 in the above-traced circuit, magnet 300 remaining unoperated in this circuit because of the comparatively high resistance of the winding of relay 385. With relay 385 operated the winding of relay 395 is now connected by way of contacts 386 and 305 to the RB wiper 62 of the primary allotter switch and ground is closed to start conductor 77*b* of secondary allotter B by way of contacts 387 and 303 so that secondary allotter SA–B is taken into use instead of allotter SA–A. Due to contact 305 being closed and 306 open, RB wiper 62 is connected up instead of RA wiper 61.

Reverting now to the simultaneous searching operation of third choice finder SLF and secondary finder SF it will first be assumed that line finder SLF finds the calling line before this finder in turn is found by the secondary finder. When line finder SLF finds the calling line, cutoff relay 110 operates in the line circuit and relays 375 and 380 operate in the primary allotter as described above and the last-mentioned relay at contact 381 causes the operation of finder switching relay 220 as before. However, in the instant case the circuit to allotter release relay 325 is not completed at contact 382 due to the fact that the circuit of this relay is still open at contact 391 of relay 390.

Subsequently when secondary finder SF finds line finder SLF the following circuit is closed for relay 540 Fig. 5 and relay 395 Fig. 3B in series: ground, contact 536, winding of relay 540, RA wiper 100 of the secondary allotter switch, RA conductor 90, RA wiper 86 or 87 of the secondary finder, RA conductor 31 in line finder SLF, RA wiper 61 of the primary allotter switch in position 10 or 21, contact 306 of the odd-even relay, contact 386, winding of relay 395, battery. Relay 540 in operating at contact 541 opens the shunt circuit across the upper winding of relay 550, thereby permitting this relay to operate in series with the winding of secondary finder magnet 420. However, as the upper winding of relay 550 is of comparatively high resistance magnet 420 is not sufficiently energized to attract its armature. Relay 550 in operating at its preliminary or "X" contacts 553 locks to ground at contact 534; at 552 opens the circuit through its upper winding; at 551 closes a circuit to secondary finder switching relay 410 which may be traced from ground through contact 551, SSW wiper 103 in position 13, conductor 93, winding of relay 410, battery; and at contact 554 opens the circuit of relay 520, thus causing slow-to-release relay 520 to restore. With relay 520 released, relay 530 and relays 540 and 550 in the secondary allotter Fig. 5 also are permitted to release.

Switching relay 410 in operating, at its contact 415 connects ground to guard conductor 91; at 416 closes a point in the all-secondary-finders-busy-chain controlling ASB conductor 79; at 414 locks to holding ground on conductor 97; at 413 returns this ground by way of wiper 84 or 85, to primary hold conductor 30; and at contacts 411 and 412 further extends the calling line by way of contacts 221, 222, conductors 28, 29, wipers 80, 82 or 81, 83, contacts 411, 412 to talking conductors 92, 96 which lead to selector SS.

Relay 395 Fig. 3B operates in series with relay 540 in the above-traced circuit. At its contact 396 relay 395 locks to ground at contact 371 by way of contact 362 independently of contact 386; and at 397 opens the circuit of relay 390 so that this last-mentioned relay releases. At contact 394 relay 390 opens the locking circuit of start relay 320 or 315 so that the start relay releases if no other call is waiting. Also, when contact 391 closes upon the restoration of relay 390, the above-traced circuit extending from ground at contact 227 is completed for allotter release relay 325 so that relay 330 restores after a slight delay. Relays 350, 360, 375 and 380 accordingly are permitted to release as explained hereinbefore. Relay 390 in operating, at contact 393 furthermore opens the circuit of relay 385 and this relay in restoring, at contact 387 removes ground from secondary start conductor 77*a*. As a result relay 510 in the secondary allotter Fig. 5 releases and this restores the last-mentioned allotter to its normal condition.

Reverting now to the above-mentioned switching through, at contacts 411, 412, of the calling line to selector SS it will be appreciated that the line relay not shown in this last-mentioned selector now operates over the calling subscriber's loop. The connection may then be further extended to any desired called subscriber, as previously explained above for calls through the first choice or second choice line finders. After the conversation between the calling and called subscriber has been terminated ground is removed in the conventional manner from hold conductor 97 at some succeeding point in the switch train and as a result switching relays 410 and 220 and line cut-off relay 110 are permitted to release.

It was assumed above that line finder SLF finds the calling line before this finder in turn is found by secondary finder SF. If on the other hand secondary finder SF finds line finder SLF before the latter has had time to find the calling line, relay 395 operates in series with relay 540 as described above as soon as the secondary finder has completed its search and relay 395 again permits relay 390 to restore so that the secondary allotter is released due to the restoration of relay 385 and a point in the operating circuit of allotter release relay 325 is closed at contact 391. However, in the instant case this last-mentioned circuit cannot be completed as yet due to this circuit still being open at contact 382 of relay 380. Subsequently when line finder SLF finds the calling line, relays 375 and 380 operate as described, and as a result of the closure of contact 382 release relay 325 is now operated permitting the release of relays 330, 350, 360, 375 and 380. With contact 394 open, the operation of line cut-off relay 110 at this time also permits allotter start relay 320 or 315 to release provided no other call is waiting for service, and this completes the release of the primary allotter.

From the foregoing description it will be seen that when the secondary finder is the first to find, the secondary allotter is released and therefore made available again to other primary allotters as soon as the secondary finder finds the line finder in calling condition, but that the release of the primary allotter is delayed until the line finder has found the calling line.

It will further be noted that due to RA wiper 61 of the primary allotter switch and main contact 306 of the odd-even relay being included in series in the above-traced testing circuit of secondary finder SF, secondary allotter SA–A permits the secondary finder allotted thereby to connect up only with a primary finder SLF allotted by a primary allotter whose odd-even relay allotted secondary allotter SA–A for use. If, in the case of overlapping calls secondary allotter SA–B were, at the same time allotted by the odd-even relay of another primary allotter in the manner explained above, main contact 305 of this relay would prepare RB wiper 62 rather than RA wiper 61 of that primary allotter switch and as a result secondary allotter SA–B which has an RB wiper instead of the RA wiper shown in Fig. 5 would permit the secondary finder allotted thereby to connect up, by way of its RB wiper, only with the primary finder SLF taken into use by the last-mentioned primary allotter. In this fashion the invention insures that a given primary finder can be seized only by a "related" secondary finder, in spite of the fact that there are provided a plurality of secondary allotters having no fixed relation to the various primary allotters.

There may be times when both secondary allotters A and B are busy. When the primary allotters such as that shown in Figs. 3A and 3B attempt to seize the secondary allotter under this condition the odd-even relay in this primary allotter will continue to operate in its self-interrupter circuit extending over contact 307 and accordingly will continue to change the condition of its main contacts 301, 302, 303, 304 and 305, 306 as long as this busy condition lasts, that is as long as both guard conductors **78*a* and 78*b* are grounded. Inasmuch as the holding time for the secondary allotter in any given call is only slight the afore-mentioned all-secondary-allotters-busy-condition usually will not last very long, but in any event timer relays 365 and 370** in the primary allotter have been arranged to supervise this condition also.

In this connection attention is called to the fact that the circuit to relay 370 remains prepared at contact 389 as long as the test relay, 385, associated with the odd-even relay is in unoperated condition. Consequently if the odd-even relay fails to find an idle secondary allotter within a predetermined time timer relay 370 will eventually operate and lock. This is made possible by the fact that under the last-mentioned condition the circuit of release relay 325 is held open at contact 391 and allotter start relay 320 or 315 held locked at contact 394, irrespective of whether or not line finder SLF has completed its search so that relays 330, 350 and 360 also are held operated. When timer relay 370 operates it opens the circuit of relay 390 at contact 371 so that the back-and-forth switching operation of the odd-even relay is stopped; at contacts 374 the primary allotter switch is "kicked off" without effect in this particular case; and at contact **374*a* the above-mentioned locking circuit for allotter start relay 320 or 315 is opened so that the primary allotter is permitted to release provided the calling line has been found by the line finder and no other call is waiting for service. In this manner the release of the primary allotter is normally prevented until the third choice line finder has both found the calling line and been found by the secondary finder; but if there is an undue delay in the allotment of a secondary allotter by the odd-even relay, the primary alotter is released under the control of timer relays 365 and 370** after the line finder has found the calling line.

It will be noted that when relay 385 operates upon seizure of the secondary allotter under the control of the odd-even relay the circuit of timer relay 370 is interrupted at contact 389 and this is for the reason to give the secondary allotter and secondary finder sufficient time to complete their respective hunting actions. Subsequently when the secondary finder has found the primary finder, relay 395 operates and relays 390 and 385 restore as above described so that the circuit for timer relay 370 is reprepared at contact 389. The purpose of this is to supervise the searching operation of the primary finder in case the last-mentioned finder has not yet found the calling line at the time this line finder is found by the secondary finder. This condition may arise, for example, if the finder SLF allotted by the primary allotter is faulty. In this case reclosure of contact 389 assures that the primary allotter is automatically advanced to another idle finder if the first line finder fails to find the calling line within a predetermined time.

Provisions are made for locking the primary allotter out of service and transmitting a busy tone to the calling line in case all third-choice paths available in the group in question are busy, either because all secondary line finders SLF in that group are busy or because all secondary finders SF happen to be in use at that time. In the first of these two cases the following circuit to the upper winding of all-finder paths-busy relay 310 is closed: ground through contacts 228 of all SLF finders in series, ATB–3 conductor 48, contacts 361, 341, 336, upper winding of relay 310, battery; and in the second case a circuit to the lower winding of relay 310 is closed, viz. over the following circuit path: ground through contacts such as 416 of all secondary finders SF in series, ASB conductor 79, contacts **365*a*, 344, 339*a*, lower winding of relay 310, battery. It will be noted that each of these two circuits can be closed only if both first-choice-finders-busy relay 335 and second-choice-finders-busy relay 340 of this particular group are operated and if relay 360** is released, that is, the primary allotter no longer engaged in a call.

When relay 310 operates it opens at 314 a point in the operating circuit of relay 330, thereby preventing this relay from operating; at 313 relay 310 operates M3 meter 67 which counts the number of times an all-paths busy condition arises in this particular group; at contact 312 relay 310 removes a shunt across the secondary winding of busy tone coil 61 so that ground is now connected to LG conductor 49 by way of this secondary winding; and at **311*a* busy tone voltage is connected to the primary winding of busy tone coil 61 over the following circuit: ground, busy tone generator 63*a*, condenser 63, contact 321 or 317, contact 311, primary winding of tone coil 61**, ground. In this manner the busy tone voltage is superimposed on the common ground connection for the line circuits of the group served by the primary allotter in question and accordingly a busy indication given to any line of this group on which a call is attempted during the all-paths busy period. It will be noted that the above arrangement of contacts 311 and 312 eliminates the necessity of interposing a common series contact in the battery supply to the lines which if it failed to close would disable all the lines of the group; yet, no unnecessary load is normally placed on the busy tone generator.

2. DETAILED DESCRIPTION OF SECOND EMBODIMENT

*Call through direct line finder*

In describing the operation of the second embodiment of the invention shown in Figs. 7 to 9 it will first be assumed that there are idle first choice finders DLF, Fig. 7, available and that at least one of them rests in its normal position 52 and at least one in its normal position 26. Under this condition supervisory relay 930, Fig. 9A, is operated in the following circuit: ground, PC*b* wiper 142 of at least one DLF finder in normal position 52, corresponding PC*b* bank contact of this finder or finders, NP1 conductor 152, winding of relay 930, NP2 conductor 151, PC*a* bank contact 26 of one or more DLF finders in position 26, PC*a* wiper 141 of this finder or finders, common resistance 146, battery. Since contact 931 of relay 390 accordingly is open relay 935 in the allotter is in its unoperated position.

Let it first be assumed that under this condition a call is originated in the first subgroup of 25 lines. When a subscriber A Fig. 1 in this subgroup lifts his handset line relay 120 operates in the above traced circuit, thereby grounding the ST–1 conductor which is designated by reference numeral 17 in Fig. 9A. Accordingly start relay 910 which is associated with the first 25 line subgroup operates in the following circuit: ground, contact 124, ST–1 conductor 17, contacts **919*b*, 924*a* and 929*b*, winding of start relay 910, battery. Relay 910 in operating at its contacts 912, 913*a* and 914 opens the operating circuits of the other three start relays respectively; at contact 911 connects the Test–1–52 wiper of the allotter switch to the right hand terminal of test relay 970, Fig. 9B by way of conductor 188 to insure that the allotter switch can allot only an idle direct finder resting in normal position 52 but not in normal position 26; and at 913 closes the following circuit for relay 965, Fig. 9B: ground, contacts 913 and 957, conductor 192, winding of relay 965, battery. Relay 965 upon operating at contacts 966, 969 and 969*b* prepares locking circuits for relays 940, 935 and 975 respectively; at 967 connects ground to the left hand terminal of test relay 970; at 968 closes a pre-energizing circuit for the last-mentioned relay extending from ground at contact 967 through the winding of relay 970, contact 968 and resistance 1117 to battery; and at 969*a* closes an obvious circuit for slow-to-operate relay 960**.

When relay 960 operates after a slight delay it prepares at its contact 961 the circuit for the upper winding of relay 990; and if test relay 970 is prevented from operating at this time due to absence of battery from the Test–1–52 bank contact in the position in which the allotter switch happens to be resting, relay 960 at its contact 962 closes the following circuit for allotter switch magnet 1100: ground, contacts **969*a*, 979*b*, 971, 962, conductor 194, contact 954, conductor 195, contact 1101, magnet 1100, battery. Allotter switch magnet 1100 accordingly attracts its armature, thereby at its interrupter contact 1101 breaking the last-traced circuit to again deenergize magnet 1100. Upon the release of the armature of the last-mentioned magnet the allotter switch advances to the next following position. Due to the interaction between magnet 1100 and interrupter contact 1101 the allotter switch is thus automatically advanced until relay 970** operates on battery being encountered by the Test–1–52 wiper.

Assuming that the line finder shown in Fig. 7 is the first idle direct finder resting in normal position 52 which is encountered by the Test–1–52 wiper the following circuit is now closed for test relay 970: ground, contact 967, winding of relay 970, conductor 188, contact 911, wiper Test–1–52 in position 3 or 14, conductor 153, NC*b* wiper 144, common resistance 145, battery. Relay 970 in operating in this circuit at its contact 971 removes the shunt across the lower winding of relay 975 so that the last-mentioned relay operates in series with allotter switch magnet 1100. Due to the comparatively high resistance of the lower winding of relay 975 magnet 1100 cannot reoperate in this circuit.

Relay 975 upon operating at its preliminary or X contact **979*c* closes a locking circuit for itself which may be traced from ground through contacts 909, 969*b* and 979*c* through the upper winding of relay 975 to battery; at 979*b* relay 975 opens the above-mentioned circuit extending through its lower winding and the winding of magnet 1100 in series; at contact 979*a* closes a point in the circuit extending over wiper-selecting wiper WS which circuit however is not completed in the instant case due to the call being originated in subgroup 1; at 979 closes an obvious circuit to slow-to-operate relay 980; at 977 closes a point in the circuit to allotter release relay 955; at 976 closes an operating circuit for finder start relay 730 extending from ground at contact 976 through conductor 187, start wiper of the allotter switch in position 3 or 14, conductor 158 to the winding of start relay 730 to battery; and at 978 closes ground to the negative talking conductor 149 incoming to selector DS namely over the following circuit: ground, resistance 1115, contact 978, SEL wiper of the allotter switch in position 3 or 14, conductor 149, and from there through a winding of the selector line relay not shown to battery. The selector line relay in operating causes holding ground to be returned over conductor 148** in a manner analogous to that described above in connection with the first embodiment.

Relay 980 Fig. 9B in the allotter operates after a slight delay. At contact 983 relay 980 in operating closes PU1 conductor 197 to the winding of timer relay 900 by way of contact 901; at 984 relay 980 closes on obvious circuit to slow-to-operate relay 995 and prepares locking circuits for relays 990, 900 and 905; and at 981 and 982 closes the following preenergizing circuit for relay 985: ground, contact 981, winding of relay 985, contact 982, resistance 1116, battery.

When start relay 730 in the line finder operates in the above-traced circuit it closes at 731 a point in the operating circuit for finder magnet 784, this circuit being completed at contact 996 of relay 995 as soon as the last-mentioned relay operates. The circuit may then be traced as follows: ground, contacts 961, 992, 986, 996, FM wiper of the allotter switch in position 3 or 14, conductor 161, contacts 731 and 741, winding of magnet 740, battery. Due to the interrupter contact 741 of magnet 740 being included in the last-traced circuit, finder switch DLF accordingly is automatically advanced from position 52 to position 1. When finder DLF leaves position 52, off-normal springs 147 are closed without immediate effect at this time; PC*b* wiper 142 in disengaging contact 52 removes a ground connection from supervisory conductor NP1; and NC*b* wiper 144 in leaving its bank contact 52 disconnects test battery from conductor 153, thereby marking this finder as unavailable to the allotter and causing the release of relay 970.

It will be noted that position 1 and any of the following positions 2–25 of finder DLF are common to subgroups 1 and 2. However, as wiper selecting relay 710 is not operated in the instant case the upper set of wipers is connected up by way of contacts 711, 713 and contact 715, with only the *a* wipers 130, 132 and 134 effectively engaging their corresponding bank contacts in positions 1 to 25. As a result, finder DLF due to the self-interrupting action of magnet 740, now searches for a calling line in subgroup 1. It will further be noted that the maximum number of steps that line finder DLF has to take in finding the calling line in subgroup 1 is 25.

When finder DLF has found the calling subscriber's line the following test circuit is completed for relay 985 Fig. 9B and line cut-off relay 110 Fig. 1 in series: ground, contact 981, winding of relay 985, test wiper of the allotter switch in position 3 or 14, conductor 159, contact 715, C1*a* wiper 134, test conductor 14, contact 121, winding of relay 110, battery. Relay 985 upon operating in the circuit at its contact 986 removes the short circuit from the upper winding of relay 990 so that the last-mentioned relay operates in series with finder magnet 740. The self-interrupting action of magnet 740 is arrested since this magnet is unable to reoperate in series with the upper winding of relay 990.

Relay 990 in operating at its preliminary or "X" contact 993 locks to ground at contact 984 by means of its lower winding; at 992 opens the series circuit extending through the upper winding of relay 990 and the winding of finder magnet 740; and at 991 closes the following circuit for switching relay 720 of the line finder: ground, contact 991, SW wiper of the allotter switch in position 3 or 14, conductor 160, winding of relay 720, battery.

When switching relay 720 operates it locks to holding ground on conductor 148 by way of its contact 721; at its contact 724 relay 720 closes direct ground to finder test wiper 134 by way of contact 715, thereby shorting the winding of test relay 985; at contact 725 closes a point in the locking circuit of wiper selecting relay 710, this however being without effect at the present time because relay 710 has not been operated in the instant case; at 727 opens a point in the homing circuilt of finder DLF which had been prepared at off-normal contact 147 when the line finder left its normal position; at 728 closes a point in the all-direct-finders-busy chain controlling ATB–1 conductor 157; at 726 completes the following circuit for allotter release relay 955: ground, contact 726, conductor 156, R1*s* wiper of the allotter switch in position 3 or 14, contact 977, conductor 191, winding of relay 955, battery; and at contacts 722 and 723 extends the calling subscriber's loop to the line relay of associated selector DS by way of the following circuit: loop over calling subscriber's line 11, conductors 12 and 13, wipers 130 and 132, contacts 711 and 712, contacts 722 and 723, talking conductors 149 and 150 and from there to the two windings of the selector line relay, not shown, to battery and ground respectively.

When allotter release relay 955 operates it opens at contacts 956 a point in the circuit of wiper-selecting relay 710, this, however, being without effect in the instant case as the circuit for this relay had not previously been completed; at 958 relay 955 opens a point in the locking circuit of relay 945, also without effect in the case described; and at 957 opens the circuit of relay 965 which upon release in turn permits relay 975 to restore. Relay 975 in releasing lets relays 955, 730 and 980 restore and relay 980 in restoring in turn causes the release of relays 985, 990 and 995. When cut-off relay 110 in the line circuit Fig. 1 operates it permits line relay 120 to restore so that ground is removed from start conductor 17 at contact 124. Therefore, if no other call in subgroup 1 is waiting for service, start relay 910 releases and this completes the release of the allotter with the possible exception of relay 930. Supervisory relay 930 in the allotter remains operated provided both normal positions 26 and 52 are still occupied each by one or more finders.

When the calling line is switched through to selector DS as just described the further completion of the connection to a called party may proceed in the manner explained above for the first embodiment. When the calling subscriber replaces his receiver at the end of the conversation ground is removed from hold conductor 149 at a succeeding point in the switch train and consequently relays 720 and 110 are permitted to restore. Relay 720 in restoring at its contact 727 completes the following homing circuit for the line finder: ground, off normal contacts 147, contacts 727, 732, 741, finder magnet 740, battery. As previously explained off normal contacts 147 open in both home positions 52 and 26 of the finder switch. In the instant case, therefore, the homing action of the finder is interrupted when the switch reaches position 26. From the foregoing it will be noted that a direct finder at the completion of each call is automatically advanced to the next following home position which means, in the case of only two home positions as assumed in the present embodiment, that each of these finders alternates between the two home positions on each call.

Let it now be assumed that a cell is originated at a subscriber's station in the second 25-line subgroup. As will be observed from Fig. 9A start relay 915 is operated in that case instead of relay 910. It will further be noted that the contacts of relay 915 correspond to those of relay 910 in all respects except that relay 915 has an additional contact 917 for operating wiper-selecting relay 710 Fig. 7. The circuit for this wiper selecting relay is completed upon the operation of relay 975 at the time an idle finder shown in Fig. 7, is seized, and it extends over the following path: ground, contacts 917, 956, conductor 190, contact **979*a*, WS wiper of the allotter switch in position 3 or 14, conductor 155, winding of relay 710, battery. Relay 710 in operating at contact 717 closes a point in its locking circuit which is later completed at contact 725 when switching relay 720 operates; and at contacts 711, 712; 713, 714; and 715, 716 transfers the talking and test circuits of the line finder from the upper to the lower set of wipers. In the instant case start relay 915 was operated as mentioned above and due to the closure of its contact 916** a DLF finder, viz. that shown in Fig. 7, had been allotted which happened to be resting in its normal position 52. Finder DLF will accordingly search for a calling line in one of its positions 1 to 25, namely by way of its C2*a* wiper 139. As mentioned above, the 25 lines of subgroup 2 are accessible over the *a*— wipers of the lower set and therefore a maximum number of only twenty-five steps again is required to reach the calling line in this group.

It will now be assumed that a call is originated by a line in the third subgroup of twenty-five lines. In this case the third start relay 920 is operated by way of start conductor ST–3, contacts **913*a*, 919*a*, 928, winding of relay 920 to battery. It will be noted from Fig. 9A that relay 920 has a contact arrangement similar to that of relay 910 except that contact 921 connects the winding of test relay 970 to the Test–1–26 wiper rather than the Test–1–52** wiper of the allotter switch. As a result the allotter switch is caused to search for an idle direct finder resting on its home position 26 wherein the *b*— wipers of the finders rest immediately ahead of 25-line subgroups 3 and 4. Assuming again that the DLF finder shown in Fig. 7 is the one allotted but that this finder in the instant case happens to rest in its home position 26 the testing circuit for the allotter switch in this case may be traced as follows: ground, contact 967, winding of relay 970, conductor 188, contact 921, Test–1–26 wiper in position 3 or 14, conductor 154, NC*a*— wiper in position 26, common resistance 145, battery. The operation of the allotter and the line finder in this case are the same as described above for a call from subgroup 1 except that wipers —L1*b*, +L1*b* and C1*b* are the ones engaging their respective contact banks when the finder steps off normal, the upper set of wipers being connected up at contacts 711, 713 and 715 due to the fact that wiper-selecting relay 710 is not operated in the case of a call from subgroup 3.

Assuming finally that a call is initiated from a line in subgroup 4 start relay 925, Fig. 9A, operates from ground at start conductor ST–4 through contacts 912, 918, 922, winding of relay 925 to battery. The contacts of relay 925 correspond in their general arrangement to those of relay 920 except that relay 925 again has an additional contact, 927, which causes the operation of wiper-selecting relay 710 incident to the allotment of an idle finder. Also similar to the case of a call from the third subgroup, contact 926 of relay 925 insures that an allotment is made only among those idle finders that happen to rest in their home position 26 and accordingly have their *b* wipers resting immediately ahead of 25-line subgroups 3 and 4. However, since relay 710 is operated in this case the lower set of wipers is connected up so that the finder upon stepping off normal, searches for a line in subgroup 4, namely by way of test wiper C2*b*. Again a maximum of only 25 steps is required to reach the calling line.

Let it now be assumed that the above-mentioned condition for the operation of supervisory relay 930 is no longer met, that is that either position 52 or position 26 or both have become vacant of line finders. Relay 930 then releases, operating relay 935 in an obvious circuit extending over contacts 931 and 943. Relay 935 at contact 938 locks to contact 969 in case relay 965 is operated, thus preventing release of relay 935 while the allotter is busy serving a call. At contacts 936 and 937 relay 935 couples the Test–1–52 and Test–1–26 wipers together so that the allotter is now enabled to allot an idle direct finder resting in either home position regardless of the origin of the call. Thus should a call originate in subgroup 1 or 2 at a time when no finders resting immediately ahead of these two subgroups are available, an idle finder resting in home position 26 can be allotted although this finder may have to take a maximum of fifty steps to reach a calling line in one of these subgroups. Similarly should a call originate in one of subgroups 3 or 4 at a time when no finder resting immediately ahead of these subgroups is available an idle finder, if any, resting in home position 52 may be allotted in spite of the fact that this finder may be compelled to execute a maximum of fifty steps before reaching a calling line in one of these subgroups.

In Fig. 7 a line finder with only two alternative home positions has been shown. The principle of the invention, however, may also be applied to line finders with more than two, for example, three or ten home positions. This has been indicated in Fig. 9A by showing in broken lines how the left hand terminal of supervisory relay 930 may be connected to battery directly instead of through the PC*a* wiper in a home position such as 26 of one or more finders. In this way relay 930 would supervise only one particular home position such as 52 of the finders and the upper make contacts of its associated relay 935 would be wired to couple the test wiper such as Test–1–52 of the corresponding subgroup together with the test wiper of the immediately preceding subgroup. For the supervision of the normal position of this last-mentioned subgroup another battery-connected supervisory relay, not shown, the same as relay 930 would be provided and this relay upon releasing incident to its home position becoming vacant would operate a relay, not shown, similar to relay 935 which at its contacts would couple the test wiper of that subgroup together with the test wiper for the next preceding subgroup and so on in cyclic order. Thus it will be noted that while a pair of relays such as 930 and 935 is required for each home position of the finders if they are equipped with more than two home positions, only one such pair of relays is required if the finders have only two alternative home positions, provided this relay is commonly controlled by both home position contacts such as PC*b* 52 and PC*a* 26 as shown in full lines in Figs. 7 and 9A.

*Call through multipled line finder*

If all individual finders DLF, Fig. 7, have been taken into use supervisory relay 930, Fig. 9A, is released and relay 935 operated and in addition all-first-choice-finders-busy relay 940 operates over the following circuit: ground, chain circuit including contacts similar to 728 of all DLF finders in the group, ATB–1 conductor 157, winding of relay 940, battery. Relay 940 upon operating at 942 locks to ground at contact 966 provided that the allotter is in use at the time and relay 965 accordingly operated; at 943 relay 940 opens the circuit of relay 935 so that this relay releases, thereby at 936 and 937 disconnecting the Test–1–52 and Test–1–26 wipers of the allotter switch from each other and from the winding of test relay 970; and at contact 941 relay 940 connects up wiper Test–2 of the allotter switch. At contacts 944 and 944*a* circuits for the upper and lower winding respectively of relay 945 are prepared.

It will be seen from Fig. 9B that the various control conductors for the multipled line finders MLF are connected to contacts 9 to 11 and again to contacts 20 to 22 in the seven allotter switch banks shown in this figure. For example the guard conductors of the MLF finders, such as guard conductor 179 associated with the multipled finder shown in Fig. 8, are connected to the respective positions in the Test–2 bank of the allotter switch. Due to the closure of contact 941 the allotter switch accordingly is now enabled to search for an idle one of the multiple finders MLF.

As mentioned before these MLF finders are similar to the individual finders DLF shown in Fig. 7 except that they have no home positions and are accordingly not equipped with the special wipers and banks as used in the DLF finders for home position supervision and control, and need not be equipped with an individual start relay. The provisions for home position control furnished in the case of the DLF finders were omitted for the multipled finders because any given finder in a multipled-finder arrangement carries only a comparatively light traffic load so that there is relatively little wear on these finders even without the use of this feature. It should be understood however that, if desired, a home position control similar to that provided for the first-choice finders could be employed in connection with the second-choice finders as well.

Since the multipled finders have no preferred home position the operation of these finders in case of a call from 25-line subgroup 3 is the same as in the case of a call from subgroup 1, and for a call from subgroup 4 is the same as for a call from subgroup 2. However, again the operation for calls from subgroup 2 or 4 differs from that for calls from subgroup 1 or 3, viz. in that in the former case wiper selecting relay 810, Fig. 8, is operated while in the latter case it is not.

Because of the afore-mentioned similarity in operation in the case of calls from the various subgroups it will be sufficient to briefly describe the functioning of the equipment in connection with a call from one of the subgroups only, say subgroup 4. Upon the origination of such a call subgroup start relay 925 operates as described above, causing the operation of relay 965 at contact 929 and, in addition, preparing a circuit for wiper selecting relay 810 at contact 927. Relay 965 among others, at contact 966 completes the locking circuit for all-first-choice-finders-busy-relay 940, at 967 prepares the operating circuit of test relay 970 and at 969*a* causes the operation of slow-to-operate relay 960. Relay 960 at contact 962 initiates the stepping operation of the allotter switch unless the finder on which the allotter switch happens to be resting at the time is idle. In this connection it should be mentioned that at contact 926 of start relay 925 the Test–1–26 wiper of the allotter switch is connected up in parallel to the Test–2 wiper, but due to the fact that none of the first-choice finders rests in its home position battery will not be found by the allotter switch by way of wiper Test–1–26.

Assuming that the multipled line finder shown in Fig. 8 is the first idle finder encountered by the allotter switch, the following circuit for test relay 970 is completed say in position 10 of this switch: ground, contact 967, relay 970, conductor 188, contact 941, conductor 186, Test–2 wiper in position 10 of the allotter switch, guard and test conductor 176, and from there through the pre-operating winding of a changeover relay similar to relay R290 of Lomax Patent 2,214,908, to battery in selector MS.

Relay 970 in operating causes relay 975 to operate and lock as described above. The closure of contact 976 of relay 975 is ineffective in this case since no circuit needs to be closed for a start relay in the case of the multipled finders. The closure of contact 978 causes resistance ground to be connected by way of the SEL wiper of the allotter switch in position 10 and conductor 181 to the negative talking conductor 177 incoming to selector MS, whereby the line relay, not shown, of this selector is operated in the manner described above. This in turn causes the operation of the hold relay, not shown, in selector MS so that ground is now returned over test conductor 176, thereby guarding this particular selector MS against seizure from an allotter of another multipled group or groups. This ground on conductor 176 also causes relay 970 to be short-circuited so that this relay releases after a short delay.

At contacts 979*a* of relay 975 the following circuit is completed for wiper selecting relay 810: ground, contacts 927 and 956, conductor 190, contact 979*a*, WS wiper of the allotter switch in position 10, conductor 182, winding of relay 810, battery. Relay 810 upon operating prepares a locking circuit at its contact 817, and at its contacts 811, 812, 813, 814 and 815, 816 effects a transfer from the upper to the lower set of the finder wipers. At contact 979 of relay 975 the circuit is closed for slow-to-operate relay 980 so that this relay operates, in turn causing the slow operation of relay 995. With relays 980 and 995 operated the searching operation of finder MLF is initiated substantially as in the case of a direct line finder, the finder stepping circuit in the present case extending over the FM wiper in position 10, conductor 185, interrupter contact 831 and finder magnet 830 to battery. In case the MLF finder happens to rest on the calling line the slow operation of relay 995 makes it possible for test relay 985 to operate before the finder stepping circuit has been closed.

In either case, when the calling line in subgroup 4 has been found by finder MLF the following circuit for test relay 985 and the cut-off relay in the line circuit is completed: ground, contact 981, winding of relay 985, test wiper of the allotter switch in position 10, conductor 183, contact 816, C2*b*— wiper 176 and from there over the corresponding test bank contact, the test conductor of the calling line and the winding of the line cut-off relay to battery in the manner described above.

The operation of relay 985 causes relay 990 to operate and lock as described and relay 990, in turn closes the following circuit to finder switching relay 820: ground, contact 991, the SW wiper of the allotter switch in position 10, conductor 184, winding of switching relay 820, battery. Switching relay 820 at contact 825 completes the locking circuit for wiper selecting relay 810; at contact 821 locks to ground on test conductor 176; at contact 824 connects direct ground to finder test wiper 176 and also to conductor 183, thereby short-circuiting test relay 985; at contacts 822 and 823 causes the calling line to be switched through to the line relay, not shown, in selector MS substantially as described above in the case of a DLF finder; at 826 closes a circuit to allotter release relay 955 by way of conductor 180 and the RLS wiper of the allotter switch in position 10. Relay 955 upon operating initiates the release of the allotter as above described. The further setting up of the connection over selector MS and also the release of the connection at the end of the conversation take place substantially in the manner explained above in connection with a call involving a DLF finder, Fig. 7.

For the supervision of the multipled finders as to an all-finders-busy condition arising therein no chain circuit has been employed as in the first embodiment, but instead the existence of this condition is derived from the fact that the allotter switch wipers make a complete sweep over the associated contact banks within the same allotting operation without encountering an idle multipled finder. This involves the provision of the LO wiper and bank, Fig. 9A of the allotter switch, only contacts 25 and 26 of this bank being wired as shown, and also the provision of relays 945 and 950.

When the allotter, in searching for an idle multipled finder reaches position 26 the following circuit for relay 945 is closed; ground, wiper LO in position 26, contact 944, upper winding of relay 945, battery. It will be noted that this circuit is taken through a make contact, 944, of all-first-choice-finders-busy relay 940 so that relay 945 can thus be operated only if all individually trunked finders are busy. Relay 945 at contact 946 completes the following locking circuit for itself: ground, time cut-off contact 1120, conductor 196, contacts 944*a*, 958 and 946, lower winding of relay 945, battery. Time cut-off contact 1120 is a part of a common timer mechanism, not shown, of any suitable type and is actuated at convenient time intervals to periodically open the locking circuit of relay 945. When relay 945 operates it further connects, at contact 947, the winding of relay 950 to contact 25 of the LO bank of the allotter switch, and at contact 948 prepares a locking circuit for the last-mentioned relay.

When the allotter switch, after unsuccessfully searching over all of its positions 1–22, subsequently reaches due to its automatic advancement position 25, the following circuit is completed for relay 950: ground, LO wiper in position 25, contact 947, winding of relay 950, battery. Relay 950 in operating, at contact 953 locks to contact 948 of relay 945; at contact 954 opens the stepping circuit of allotter switch magnet 1100, thereby preventing any further stepping operation of this switch and thus locking the allotter out of service; at contact 951 opens the short circuit across the secondary winding of busy tone induction coil 1114; and at contact 952 closes the following circuit through the primary winding of this coil: ground, common busy tone generator 1113, condenser 1112, primary winding of induction coil 1114, contact 952, ground. Busy tone accordingly is transmitted, by way of LG conductor 16, to the calling subscriber's line circuit substantially in the manner described in connection with the first embodiment.

As pointed out above the locking circuit of relay 945 is dependent on time cut-off contact 1120. Therefore, as soon as this contact is now opened by the common timing mechanism, relay 945 is permitted to release so that relay 950 also restores, thereby discontinuing the transmission of busy tone to the calling subscriber and re-preparing the stepping circuit for allotter switch magnet 1100. Therefore, if the calling subscriber has not abandoned the call in the meantime so that relays 925 and 965 are still operated, the allotter switch will be given another chance to find an idle multipled finder. On the other hand, if the calling subscriber has replaced his receiver the allotter becomes available again for the serving of other calls. In either case, if one of the MLF finders has become idle in the meantime, the allotter will operate as described above to take this idle finder into use. On the other hand, if the allotter switch again fails to find an idle MLF finder, relay 945 and, after a complete half-revolution of the switch relay 950 will again operate and lock as described above, thereby again causing the allotter to be locked out of service and busy tone to be transmitted to the calling party.

In the foregoing explanation of the operation of relays 945 and 940 it was assumed that relay 940 remained operated due to continued existence of an all-first-choice-finders-busy condition. If this relay releases due to one of the individual trunk finders becoming available, at any time while relay 945 is operated, the circuit through both windings of relay 945 are opened at contacts 944 and 944a so that relay 945 restores immediately regardless of the condition of time cut-off contact 1120; and if relay 950 is operated at this time this last-mentioned relay also restores, thereby making the allotter available again for service.

Provisions are made to automatically advance or "kick-off" the allotter if a first-choice finder or a second choice finder, as the case may be, fails to find the calling line within a given time. This feature involves the provision of pulse conductors PU1 and PU2 which at their far end are connected to impulse contacts, not shown, of the common timer mechanism mentioned above. This timer is arranged to transmit by means of the impulse contacts just referred to, a pulse first over the PU2 conductor and immediately thereafter over the PU1 conductor in suitable recurring intervals. Let it be assumed, for instance, that the DLF finder, Fig. 7, has been taken into use and that due to a fault in this finder the latter keeps rotating without finding the calling line. In this case timer relay 900 in the allotter, Fig. 9B, is operated from the ground pulse received over PU1 conductor 197 by way of contacts 983 and 901, thereby at its contact 902 locking to contact 984 and, at 903 connecting the winding of the other timer relay, 905, to PU2 conductor 198, and when subsequently, i. e. at the end of the timing interval a ground pulse is received over PU2 conductor 198, relay 905 operates from this ground by way of contacts 903 and 906, thereby locking to contact 984 by way of its own contact 907. At contact 908 relay 905 closes a circuit to allotter switch magnet 1100 so that this magnet operates, and at contact 909 the relay opens the locking circuit of relay 975. Relay 975 in releasing, at 979 opens the circuit of relay 980 so that this relay restores. The release of relay 980, in turn, permits timer relays 900 and 905 to restore. As a result the operating circuit of allotter switch magnet 1100 is reopened at contact 908 this magnet accordingly released, and the allotter switch advanced to its next following position. The allotter by means of its relay 970, then tests the finder connected to the last-mentioned position for its busy condition and if this finder happens to be idle causes this other finder to search for the calling line. On the other hand, if this finder is busy the allotter switch continues its search until an idle finder is found. The allotted finder then completes the call in the manner described above.

While only two embodiments of the invention have been illustrated and described it is to be understood that numerous modifications in the details of arrangement may be resorted to without departing from the true spirit and scope of the invention as defined in the appended claims.

What is claimed is:

1. In a telephone system, a number of groups of line circuits, a corresponding number of groups of primary line finders having access to said line circuits, a group of secondary finders each having access to finders of different ones of said primary groups, a primary allotter for each of said primary groups, a plurality of secondary allotters for said secondary group, each of said secondary finders having a plurality of sets of test bank contacts each set for use with a different one of said secondary allotters, each of said primary allotters having means operative in response to the origination of a call in a line circuit of the associated primary group for starting an idle one of said primary finders on a searching operation, seizing an idle one of said secondary allotters and causing said primary finder to be marked as calling in the set of test bank contacts of the secondary finders which corresponds to the secondary allotter seized by said primary allotter, said secondary allotter being operative in response to said seizure for starting an idle one of said secondary finders in search of a calling primary finder in the set of bank contacts only that corresponds to the last-mentioned secondary allotter.

2. In a telephone system, a number of groups of line circuits, a corresponding number of groups of primary finders having access to said line circuits, a group of secondary finders each having access to finders of different ones of said primary groups, a primary allotting apparatus for each of said primary groups, a plurality of secondary allotting apparatus for said secondary group, a plurality of connecting means each for establishing an individual connection between a given one of said primary allotting apparatus and a given one of said secondary allotting apparatus in accordance with the availability of said apparatus to form pairs of allotting apparatus, a given one of said primary allotting apparatus being operative in response to the origination of a call in a line circuit of the associated primary group for starting an idle one of said primary finders on a searching operation and causing said primary finder to be marked as calling in said secondary finders, and the secondary allotting apparatus paired to said primary allotting apparatus by way of the corresponding individual connection being operative upon the origination of said call to start an idle one of said secondary finders on a searching operation, and means controlled by said connecting means for preventing said secondary finder in the case of overlapping calls in different primary groups from seizing a calling primary finder that was started by a primary allotting apparatus other than the one paired with the secondary allotting apparatus that started said secondary finder.

3. In a telephone system, a combination as defined in claim 2 and further including means in each of said primary allotting apparatus effective in response to the seizure of said idle primary finder by said apparatus incident to the origination of said call for rendering said secondary allotting apparatus operative.

4. In a telephone system, a combination as defined in claim 2, wherein each of said secondary allotting apparatus has a separate start conductor, and wherein said connecting means are in the form of switching devices each associated with a given one of said primary allotting apparatus and having access to said plurality of secondary allotting apparatus and each effective under the control of the associated primary allotting apparatus to individually connect said apparatus with the start conductor of an idle secondary allotting apparatus.

5. In a telephone system, a combination as defined in claim 4 wherein each of primary allotting apparatus includes means effective in response to said idle primary finder being seized by said apparatus for connecting a start potential to said start conductor and cut-off means operative in response to said primary finder being found by said secondary finder for disconnecting said start potential from said start conductor, thereby permitting the corresponding allotting apparatus to release.

6. In a telephone system, a number of groups of line circuits, a corresponding number of groups of primary line finders having access to said line circuits, a group of secondary finders each having access to finders of different ones of said primary group, a primary allotting apparatus for each of said primary groups, a plurality of secondary allotting apparatus for said secondary group each having a separate start conductor, each of said primary allotting apparatus having associated therewith a switching device having access to said plurality of secondary allotting apparatus and effective under the control of said primary allotting apparatus to select an idle secondary allotting apparatus and individually connect said primary allotting apparatus with the start conductor of the selected idle secondary allotting apparatus, said primary allotting apparatus being operative in response to the origination of a call in a line circuit of the associated primary group to start an idle one of said primary finders in search of said calling line circuit, cause said primary finder to be marked as calling in said secondary finders and connect a start potential to the start conductor connected up by the associated switching device, and the corresponding secondary allotting apparatus being operative in response to the connection of start potential to said conductor to start an idle one of said secondary finders in search of said primary finder.

7. In a telephone system, a combination as defined in claim 6 and further including means in each of said primary allotting apparatus effective in response to the seizure of said primary finder by said apparatus incident to the origination of said call for starting the associated switching device in search of an idle secondary allotting apparatus and connecting a start potential to the start conductor of the last-mentioned apparatus when found.

8. In a telephone system, a combination as defined in claim 7 and wherein timing means are associated with said primary allotting apparatus, said timing means being effective under the control of the associated switching device for advancing said allotting apparatus to another primary finder if said switching device fails to select an idle secondary allotting apparatus within a predetermined time.

9. In a telephone system, a combination as defined in claim 8 and wherein said primary allotter has associated therewith release means controlled by the started primary finder for releasing said primary allotting apparatus depending on said primary finder having both found said calling line and having been found by said secondary finder; and wherein the timing means mentioned in claim 8 are also effective under the control of said release means for advancing said allotting apparatus if said apparatus fails to be released by said primary finder within a predetermined time.

10. In a telephone system, the combination as defined in claim 6 and wherein there are provided for said secondary group two secondary allotting apparatus each having a separate start conductor, and wherein said switching devices are in the form of a plurality of odd-even relays each associated with one of said primary allotting apparatus.

11. In a telephone system, a combination as defined in claim 6, and wherein said switching devices are in the form of a plurality of odd-even relays each associated with one of said primary allotting apparatus and being of the type having a magnet and main and auxiliary contact means in the form of relay spring combinations, both said main and auxiliary contact means having two alternative conditions, the condition of said main contact means being changed once for every full actuating and releasing cycle of said magnet and the condition of said auxiliary contact means being changed upon each actuation and also upon each release of said magnet; the main contact means of each of said relays including a pair of contacts each connecting with one of said start conductors, and also including a pair of test contacts, the two individual contacts of each pair being respectively closed in said two conditions and a busy secondary allotting apparatus being marked by a guarding potential applied to the respective test contact of said relays; the auxiliary contact means of each of said relays including a break contact; and there being provided a self-interrupter circuit which is energized by said guarding potential upon the initiation of a start conductor selecting operation in a given primary allotting apparatus for causing the main contact means of the associated odd-even relay to change their condition, said interrupter circuit including in series connection the respective test contact, said break contact and magnet of said relay.

12. In a telephone system, a hunting means, two connecting circuits accessible to said means, a first and a second electric potential; said hunting means comprising an odd-even relay of the type having a magnet and main and auxiliary contact means in the form of relay spring combinations and each having two alternative conditions, the condition of said main contact means being changed once for every full actuating and releasing cycle of said magnet and the condition of said auxiliary contact means being changed upon each actuation and also upon each release of said magnet; said main contact means providing access in their two conditions to said two connecting circuits respectively and including a pair of test contacts respectively closed in said two conditions, means associated with each of said circuits for applying said first potential to the respective test contact to keep said circuit from being seized by said relay, and a self-interrupter circuit including said first potential, the test contact so marked, said auxiliary contact means, said magnet and said second potential, the actuation of said magnet incident to the closure of said interrupter circuit being effective to open said auxiliary contact means, the deenergization of said interrupter circuit incident to said opening being effective to cause the release of said magnet, and said main contact means being shifted, responsive to the full actuating and releasing cycle of said magnet, into their condition in which they give access to the other connecting circuit.

13. In a telephone system, a number of groups of lines each having a line circuit, a corresponding number of groups of line finders, a plurality of secondary non-numerical switches and a plurality of first numerical switches, said line finders comprising individually trunked line finders and commonly trunked line finders, each of the first-mentioned line finders being separately connected with one of said numerical switches and said commonly trunked finders comprising line finders of a first and a second kind, each of the finders of the first kind being connected with one of said numerical switches in multiple with line finders of one or more other groups and each of the finders of the second kind being trunked to a number of said numerical switches by way of said secondary non-numerical switches, each of said line finder groups having an allotter connected therewith, the allotter of a given group having access to both individually trunked and commonly trunked line finders but being normally effective upon the initiation of a call in said group to take a selected idle one of the individually trunked line finders of said group into use, means effective upon all the individually trunked line finders of said group being busy for permitting said allotter to select an idle one of the commonly trunked line finders of one kind but not the other kind of said group for use and means effective upon all the commonly trunked line finders of said one kind also being unavailable for service for permitting said allotter to select an idle one of the commonly trunked line finders of the other kind of said group.

14. In a telephone system, a combination as defined in claim 13, and wherein there is provided a source of busy tone voltage and means operative upon all line finders of said group being busy for preventing said allotter from carrying out a selecting operation and for connecting said voltage source to all line circuits of said group.

15. In a telephone system, a number of groups of lines each having a line circuit, a corresponding number of groups of line finders, a plurality of first numerical switches, said line finders comprising individually trunked line finders and commonly trunked line finders, each of the first-mentioned line finders being individually and separately connected with one of said numerical switches and each of the second-mentioned line finders being trunked to one of said numerical switches in common with line finders of one or more other groups, a source of busy tone voltage, allotting apparatus connected with each of said line finder groups and normally effective upon the initiation of a call in one of said groups to take an idle individually trunked line finder of said group into use, means operative upon all the individually trunked line finders of said group being busy for permitting said allotting apparatus to take an idle commonly trunked line finder of said group into use, and means operative upon all line finders of said group being busy for effectively connecting said voltage source to all line circuits of said group.

16. In a telephone system, a plurality of lines, a line circuit for each of said lines, circuit connections for feeding central battery to said lines including in one leg a conductor common to said line circuits, a number of line finders having access to said line circuits, an allotting apparatus connected in common with said line finders, a busy tone source, a busy tone coil in said allotting apparatus and having a primary and a secondary winding, one end of said secondary winding being connected to said common conductor and the other end to one side of said central battery, the first-mentioned end of said secondary winding also being normally connected to said side of the central battery, whereby said secondary winding is shunted, and said primary winding being normally open-circuited, and means operative upon all said finders being unavailable for service for effectively connecting said primary winding to said busy tone source and removing said shunting connection from the first-mentioned end of said secondary winding, whereby busy tone is superimposed on the central battery supply to said lines.

17. In a telephone system, a plurality of lines, a plurality of line finders having access to said lines, an allotting apparatus serving said line finders and including an allotter switch of the non-homing type and having a set of wipers and of contact banks providing access to said finders, and means controlled by said switch and operative upon said switch having moved its wipers, within the same allotting operation, over the bank contacts corresponding to all of said finders without finding an idle finder for locking said allotting apparatus out of service.

18. In a telephone system, a combination as defined in claim 17, and wherein the last-mentioned means include first and second relay means, said first relay means being operative in a predetermined position of said switch for preparing the operation of said second relay means, and said second relay means being operative in a predetermined position reached by said switch upon having subsequently moved its wipers over the bank contacts corresponding to all of said finders within the same allotting operation without finding an idle finder for making said lockout effective.

19. In a telephone system, a number of groups of lines each having a line circuit, a corresponding number of groups of line finders, a plurality of first numerical switches, said line finders comprising individual finders and multipled finders, each of the individual finders being separately connected with one of said numerical switches and each of the multipled finders being connected with one of said numerical switches in common with line finders of one or more other groups, allotting apparatus connected with each of said line finder groups, each including an allotter switch of the non-homing type and having a set of wipers and of contact banks, said switch providing access to both the individual and multipled finders of the corresponding group but being normally prevented from allotting multipled finders, means effective upon all individual finders of a given group being busy for permitting the corresponding allotter switch to allot multipled finders, and means controlled by said allotter switch and operative upon said switch having moved its wipers within the same allotting operation, over the bank contacts corresponding to all finders of said group without finding an idle finder for locking said allotter apparatus out of service.

20. In a telephone system, a combination as defined in claim 19, and wherein the means first-mentioned in claim 19 comprise a relay and circuit connections for said relay jointly controlled by all the individual finders of said group and wherein the means last-mentioned in claim 19 comprise first and second relay means; said relay being effective upon all said individual finders being busy for permitting the corresponding allotter switch to allot multipled finders and for preparing the operation of said relay means; said first relay means being thereafter operative in a predetermined position of said switch for preparing the operation of said second relay means; and said second relay means being operative in a predetermined position reached by said switch upon having subsequently moved its wipers over the bank contacts corresponding to all of said finders within the same allotting operation without finding an idle finder for making said lockout effective.

21. In a telephone system a combination as defined in claim 20, and further including timer means intermittently operated independently of said allotter switch and holding connections for said second relay means controlled both by said relay and by said timer means, whereby said lockout condition is immediately removed when one of said individual finders becomes idle and is periodically removed even though all of said individual finders remain busy.

22. In a telephone system, a group of lines comprising a plurality of subgroups, a group of finder switches having bank contacts accommodating said group of lines, each finder switch having a plurality of normal positions each immediately preceding the bank contacts accommodating the lines of one of said subgroups, means responsive to the initiation of a call on one of said lines for starting an idle finder switch in search of said calling line which rests in the normal position preceding the bank contact accommodating the calling subgroup, and means effective upon the termination of each call for automatically moving the finder switch used in said call onto the next following of said normal positions regardless of whether one or more other finder switches are already resting in the last-mentioned position.

23. In a telephone system, a group of lines comprising a plurality of subgroups, a group of single-motion finder switches having bank contacts accommodating said group of lines, means associated with each finder switch to define a plurality of predetermined positions as normal positions of said switch, each immediately preceding the bank contacts accommodating the lines of one of said subgroups, means responsive to the initiation of a call on one of said lines for starting an idle finder switch in search of said calling line which rests in the normal position preceding the bank contacts accommodating the calling subgroup, means effective upon the termination of each call for automatically advancing the finder switch used in said call irrespective of the existence of other completed or incompleted calls in said subgroup, said advance being stopped under the control of said first-mentioned means in the next-following normal position regardless of whether the last-mentioned position is already occupied by one or more other finder switches.

24. In a telephone system, a group of lines comprising a plurality of subgroups, a group of finder switches having bank contacts accommodating said group of lines, each finder switch having a plurality of alternative normal positions one for each subgroup and each preceding the bank contacts accommodating the lines of the corresponding subgroup, and having a plurality of control contacts respectively actuated by said finder switch when resting in the corresponding normal position, means responsive to the initiation of a call on one of said lines for ordinarily starting an idle finder switch in search of said calling line which rests in the normal position of the calling subgroup, and relay means connected to corresponding control contacts of all of said finder switches to supervise said normal positions, said relay means being responsive to an associated normal position becoming free of finder switches to change its condition and the first-mentioned means being placed in condition responsive to said change of condition of said relay means, to start an idle finder switch resting in the normal position of a subgroup other than the calling subgroup.

25. In a telephone system, a group of lines comprising a plurality of subgroups, a group of finder switches having bank contacts accommodating said group of lines, each finder switch having a plurality of alternative normal positions one for each subgroup and each preceding the bank contacts accommodating the lines of the corresponding subgroup and having a plurality of control contacts respectively actuated by said finder switch when resting in the corresponding normal position, means responsive to the initiation of a call on one of said lines for ordinarily starting an idle finder switch in search of said calling line which rests in the normal position of the calling subgroup, and relay means connected to corresponding control contacts of all said finder switches, the relay means connected to a given control contact of said switches being responsive to the associated normal position becoming free of finder switches to change its condition, and the first-mentioned means being placed in condition responsive to said change of condition of said relay means, to start an idle finder switch resting in the normal position of the subgroup whose bank contacts precede those of the calling subgroup.

26. In a telephone system, a group of lines comprising a first and a second subgroup, a group of finder switches having bank contacts accommodating said group of lines, each finder switch having a first and a second alternative normal position one for each subgroup and each preceding the bank contacts accommodating the lines of the corresponding subgroup, and having first and second control contacts respectively actuated by said finder switch when resting in the corresponding normal position, means responsive to the initiation of a call on one of said lines for ordinarily starting an idle finder switch in search of said calling line which rests in the normal position of the calling subgroup, and a relay connected in multiple to said first control contacts of all of said finder switches and also connected in multiple to said second control contacts of all of said finder switches to supervise said normal positions, said relay being responsive to either normal position becoming free of finder switches to change its condition and said means being placed in condition, responsive to said change of condition of said relay, to start an idle finder switch resting in either normal position.

27. In a telephone system, a group of lines comprising a plurality of subgroups, a group of finder switches having bank contacts accommodating said group of lines, each finder switch having a plurality of alternative normal positions, one for each subgroup and each preceding the bank contacts accommodating the lines of the corresponding subgroup and having a plurality of marking contacts respectively actuated by said finder switch when resting in the corresponding normal position, an allotter apparatus having access to said group of finder switches and responsive to the initiation of a call on one of said lines for ordinarily selecting an idle finder switch for service of said calling line which is marked by said marking contacts as resting in the normal position of the calling subgroup, supervisory means responsive to the normal position of a given subgroup becoming free of finder switches for enabling said allotter apparatus to select an idle finder switch marked by said marking contacts as resting in the normal position of a subgroup other than the calling subgroup, and means controlled by said finders for automatically varying their normal positions.

28. In a telephone system, a group of lines comprising a plurality of subgroups, a group of finder switches having bank contacts accommodating said group of lines, each finder switch having a plurality of alternative normal positions, one for each subgroup and each preceding the bank contacts accommodating the lines of the corresponding subgroup and having a plurality of marking contacts respectively actuated by said finder switch when resting in the corresponding normal position, an allotter apparatus having access to said group of finder switches, identifying means responsive to the initiation of a call on one of said lines for identifying to said apparatus the subgroup calling, said apparatus being controlled by said identifying means to select an idle finder switch for service of said calling line which is marked by said marking contacts as resting in the normal position of the subgroup identified as calling by said identifying means, and means controlled by said finders for automatically varying their normal positions.

29. In a telephone system, a combination as defined in claim 28 and wherein said allotter apparatus comprises a battery-searching allotter switch having a separate wiper and bank for each of said subgroups, an idle finder switch being marked as resting in the normal position of a given subgroup by battery connected to the corresponding allotter switch bank by way of the respective one of said marking contacts, and said allotter switch being responsive to the initiation of a call for selecting an idle finder switch for service of said calling line, by way of the allotter switch wiper and bank associated with the calling subgroup.

30. In a telephone system, a combination as defined in claim 28, and including supervisory means responsive to the normal position of a given subgroup becoming free of finder switches for enabling said allotter apparatus to select an idle finder switch marked by said marking contacts as resting in the normal position of a subgroup other than said calling subgroup.

31. In a telephone system, a group of lines comprising a plurality of subgroups, a group of finder switches, a group of lines comprising a plurality of subgroups, a group of finder switches having access to said group of lines, each finder switch having a plurality of sets of wipers and contact banks, means for selectively making one of said wiper sets effective, a plurality of alternative normal positions, one for each set of subgroups and each preceding the bank contacts accommodating the lines of the corresponding set of subgroups, and a plurality of marking contacts respectively actuated by said finder switch when resting in the corresponding normal position; an allotter apparatus having access to said group of finder switches, identifying means responsive to the initiation of a call on one of said lines for identifying to said apparatus the subgroup calling, said apparatus being controlled by said identifying means to select an idle finder switch for service of said calling line which is marked by said marking contacts as resting in the normal position of the set of subgroups identified by said identifying means, and the wiper selecting means of the selected finder switch being subsequently controlled by said identifying means to select the wiper set of said switch which gives access to the particular subgroup calling.

32. In a telephone system, a plurality of groups of lines each comprising a plurality of subgroups, a plurality of groups of finder switches each group having bank contacts accommodating the associated group of lines and each comprising regular finder switches and overflow finder switches, a plurality of first numerical switches, each regular finder switch being individually associated with one of said numerical switches and overflow finder switches from a number of different groups being trunked in common to others of said numerical switches, each regular finder switch having a plurality of alternative normal positions one for each subgroup of the corresponding group and each preceding the bank contacts accommodating the lines of the corresponding subgroup, and having a plurality of marking contacts respectively actuated by said finder switch when resting in the corresponding normal position, a plurality of allotter apparatus each having access to its corresponding group of finder switches and responsive to the origination of a call on a line of the corresponding group for ordinarily selecting an idle regular finder switch for service of said calling line which is marked by said marking contacts as resting in the normal position of the calling subgroup, and supervisory means responsive to the normal position of a given subgroup becoming free of regular finder switches for enabling said allotter apparatus to select an idle regular finder switch marked by said marking contacts as resting in the normal position of a subgroup other than the calling subgroup, and responsive to all regular finder switches becoming busy for enabling said allotter apparatus to select an idle overflow finder switch.

33. A rotary-type finder switch having a stepping magnet, a shaft, a plurality of sets of single-ended wipers carried by said shaft, a contact bank associated with each of said wipers, the individual wipers of each set being multipled together and circumferentially displaced on said shaft with respect to each other so as to successively engage their associated contact bank, means for defining a plurality of alternative normal positions for said shaft, each in a position of said shaft in which a wiper of each set rests near the beginning of the associated bank, and said switch having associated therewith means effective upon the termination of each call for placing said magnet in an interrupter circuit said interrupter circuit being opened, under the control of said first-mentioned means, in the next-following of said normal positions, and means for preventing seizure of said finder switch except when resting in any of said normal positions.

References Cited in the file of this patent

UNITED STATES PATENTS

| | | |
|---|---|---|
| 1,902,186 | Saunders | Mar. 21, 1933 |
| 1,914,540 | Taylor et al. | June 20, 1933 |
| 2,568,304 | Hall | Sept. 25, 1951 |